(12) United States Patent
Yoshiyama et al.

(10) Patent No.: US 9,184,853 B2
(45) Date of Patent: Nov. 10, 2015

(54) RECEPTION DEVICE

(71) Applicant: MegaChips Corporation, Osaka-shi (JP)

(72) Inventors: Masayuki Yoshiyama, Chiba (JP); Hideyuki Sato, Koto-ku (JP)

(73) Assignee: MegaChips Corporation, Osaka-shi (JP)

( * ) Notice: Subject to any disclaimer, the term of this patent is extended or adjusted under 35 U.S.C. 154(b) by 155 days.

(21) Appl. No.: 14/010,702

(22) Filed: Aug. 27, 2013

(65) Prior Publication Data

US 2014/0064744 A1 Mar. 6, 2014

(30) Foreign Application Priority Data

Aug. 30, 2012 (JP) ................ 2012-190066
Aug. 30, 2012 (JP) ................ 2012-190099
Jul. 10, 2013 (JP) ................ 2013-144341

(51) Int. Cl.
| | |
|---|---|
| *H04B 10/60* | (2013.01) |
| *H04B 10/272* | (2013.01) |
| *H04B 10/69* | (2013.01) |
| *H04L 7/033* | (2006.01) |

(52) U.S. Cl.
CPC ............ *H04B 10/60* (2013.01); *H04B 10/272* (2013.01); *H04B 10/69* (2013.01); *H04L 7/0337* (2013.01)

(58) Field of Classification Search
CPC ............ H03D 3/24; H03L 5/00; H03L 7/00; H03L 7/06; H03L 7/085; H04B 1/10; H04B 1/16; H04B 10/00; H04B 10/20; H04B 10/60; H04B 15/00; H04B 10/272; H04B 10/69; H04J 3/06; H04L 7/00; H04L 7/02; H04L 27/00; H04L 27/06; H04L 27/28
USPC .............. 327/105, 146, 155, 157, 162, 163; 370/509; 375/219, 260, 316, 346, 354, 375/355, 359, 362, 365, 373, 376; 398/58, 398/66, 154, 202; 714/704, 708, 732, 762, 714/799

See application file for complete search history.

(56) References Cited

U.S. PATENT DOCUMENTS 5,920,600 A * 7/1999 Yamaoka et al. ............. 375/376
6,737,896 B2 5/2004 Yoshioka
(Continued)

FOREIGN PATENT DOCUMENTS

| JP | 2003-283332 | 10/2003 |
|---|---|---|
| JP | 2007-43460 | 2/2007 |

(Continued)

*Primary Examiner* — Sam K Ahn
*Assistant Examiner* — Shawkat M Ali
(74) *Attorney, Agent, or Firm* — Oblon, McClelland, Maier & Neustadt, L.L.P.

(57) ABSTRACT

A first phase setting circuit generates a first phase setting signal. A first synchronous signal generator generates a first synchronous clock signal having a phase set by the first phase setting signal from a multi-phase local clock signal. By removing a phase fluctuation component representing phase fluctuation of the reception data signal from a first signal including a frequency component representing a frequency offset between a multi-phase local clock signal and a reception data signal and the phase fluctuation component, a second generation unit generates a second signal including the frequency component. The first phase setting circuit updates the first phase setting signal according to the second signal.

22 Claims, 27 Drawing Sheets

(56) References Cited

U.S. PATENT DOCUMENTS

| | | | |
|---|---|---|---|
| 7,239,813 B2 * | 7/2007 | Yajima et al. | 398/154 |
| 7,483,506 B2 | 1/2009 | Yajima et al. | |
| 7,692,499 B2 | 4/2010 | Liu et al. | |
| 7,844,023 B2 * | 11/2010 | Farjad-Rad | 375/373 |
| 8,204,168 B2 | 6/2012 | Yajima et al. | |
| 8,422,612 B2 * | 4/2013 | Ide et al. | 375/354 |
| 8,514,955 B2 * | 8/2013 | Moriizumi | 375/260 |
| 2003/0142773 A1 * | 7/2003 | Shirota et al. | 375/373 |
| 2007/0011534 A1 * | 1/2007 | Boudon et al. | 714/732 |
| 2007/0047689 A1 * | 3/2007 | Menolfi et al. | 375/376 |
| 2007/0160173 A1 * | 7/2007 | Takeuchi | 375/355 |
| 2009/0123160 A1 * | 5/2009 | Yajima et al. | 398/154 |
| 2009/0162063 A1 * | 6/2009 | Mizutani et al. | 398/58 |
| 2009/0296867 A1 * | 12/2009 | Do et al. | 375/371 |
| 2009/0323875 A1 * | 12/2009 | Kossel | 375/354 |
| 2010/0040182 A1 * | 2/2010 | Yang et al. | 375/355 |
| 2010/0067633 A1 * | 3/2010 | Den Besten | 375/373 |
| 2011/0001531 A1 * | 1/2011 | Nishi et al. | 327/162 |
| 2011/0064176 A1 * | 3/2011 | Takada | 375/355 |
| 2011/0194659 A1 * | 8/2011 | Kenney | 375/355 |
| 2011/0194660 A1 * | 8/2011 | Kenney et al. | 375/355 |
| 2012/0051480 A1 * | 3/2012 | Usugi et al. | 375/376 |
| 2012/0105115 A1 * | 5/2012 | Yamamoto et al. | 327/156 |

FOREIGN PATENT DOCUMENTS

| | | |
|---|---|---|
| JP | 2007-201842 | 8/2007 |
| JP | 2011-9984 | 1/2011 |

* cited by examiner

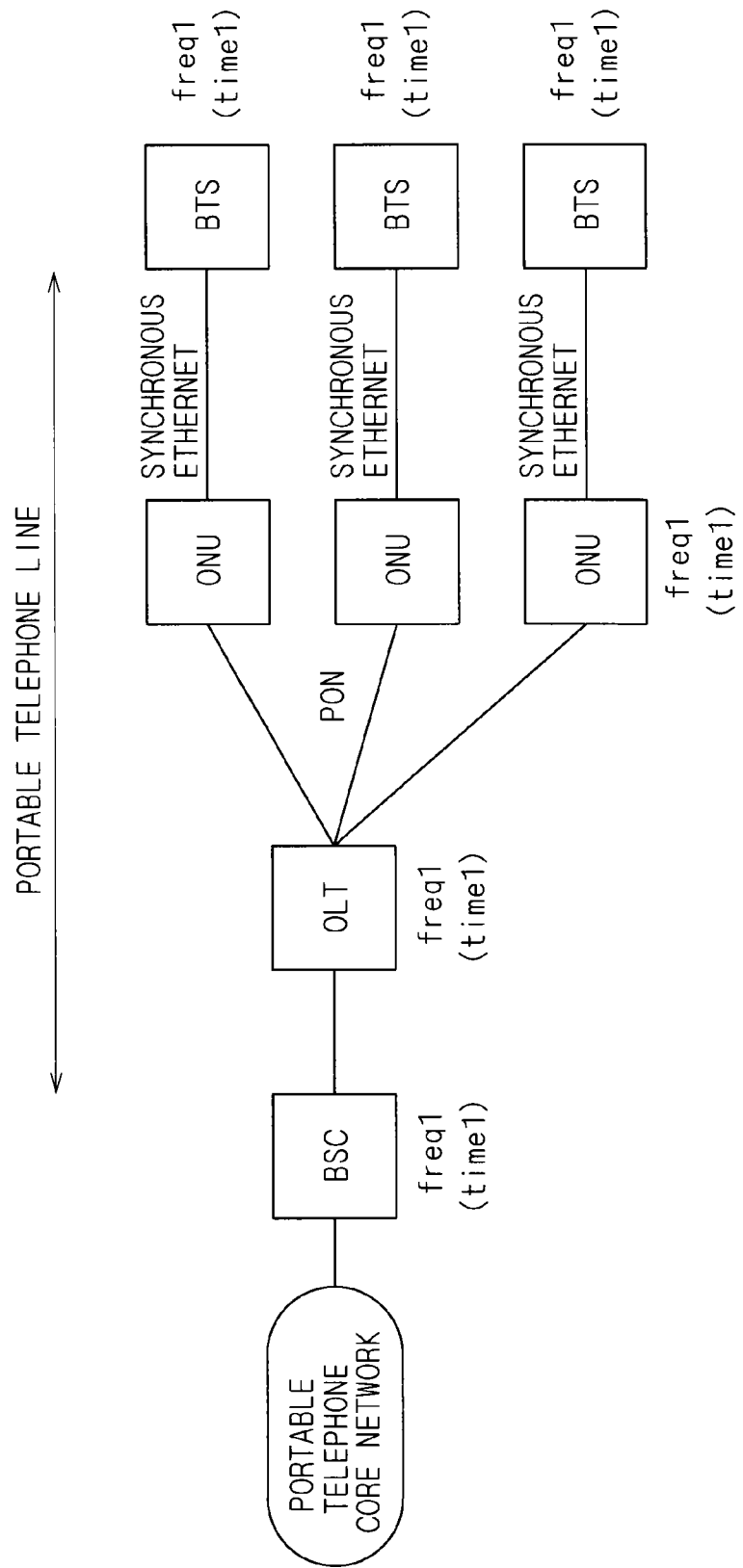

F I G. 3A
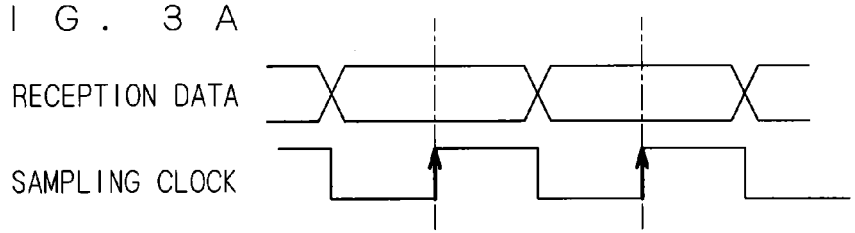
F I G. 3B
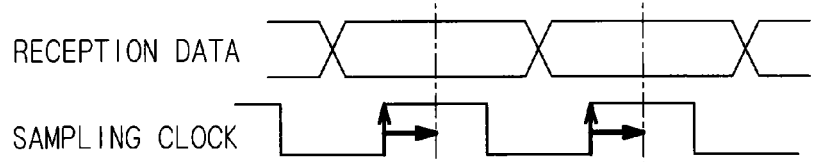
F I G. 3C
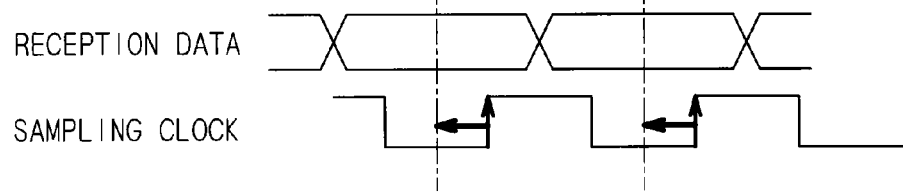

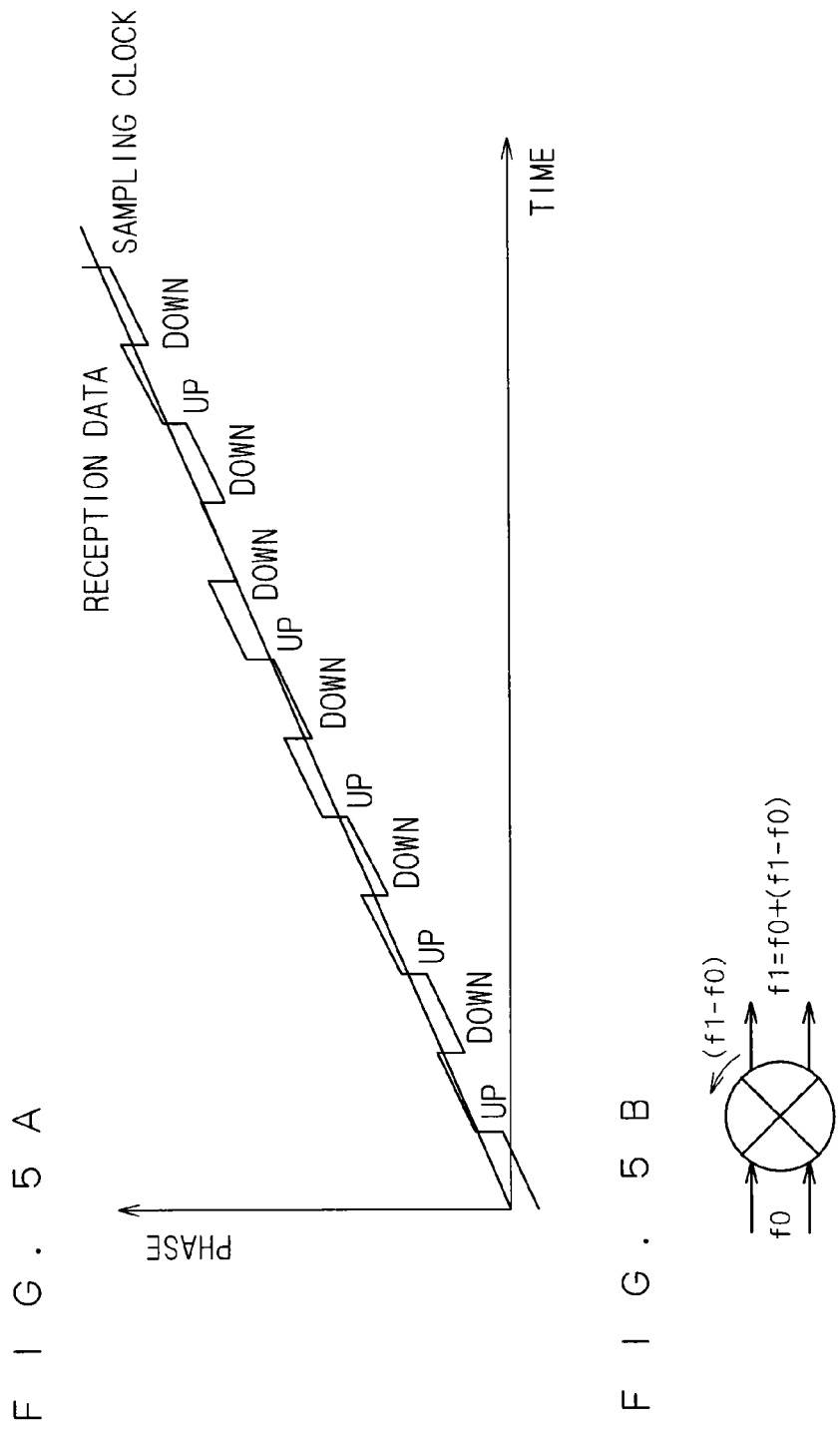

F I G. 7
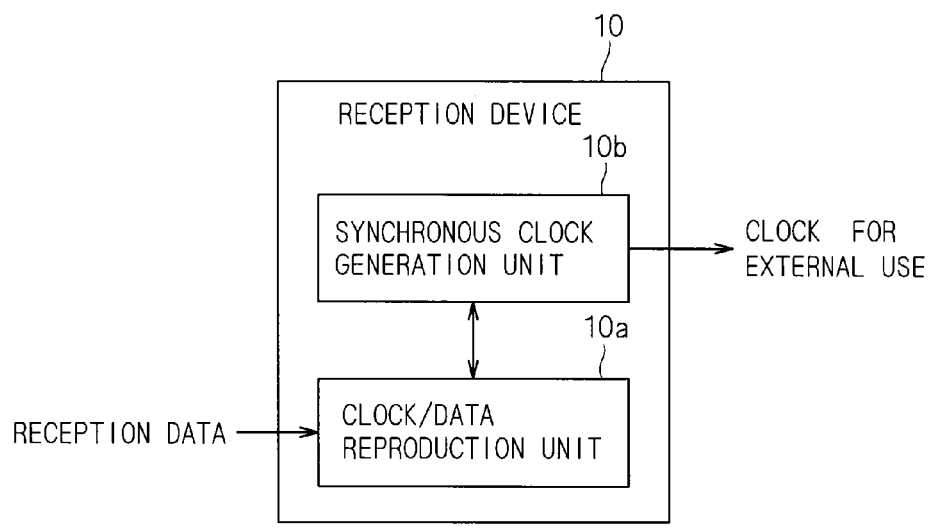

F I G. 1 3 A
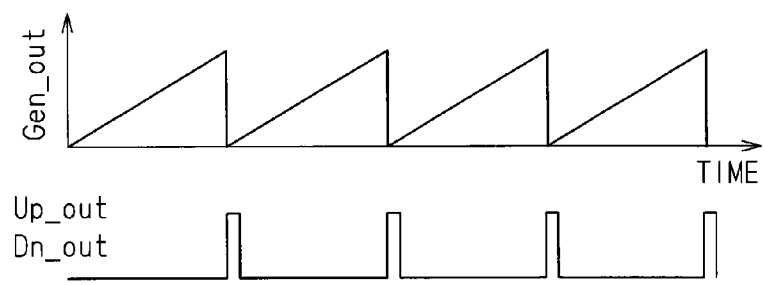
F I G. 1 3 B
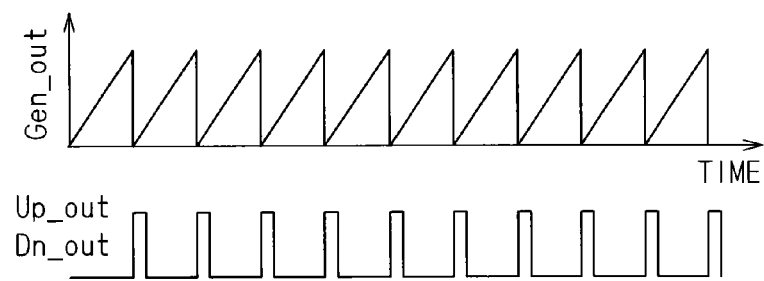

F I G. 1 4
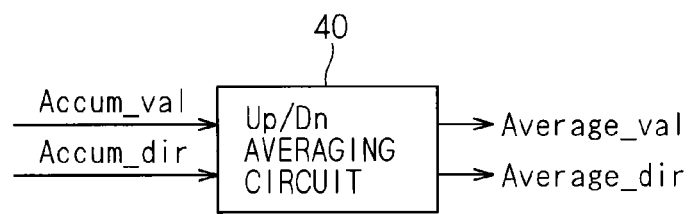
F I G. 1 5
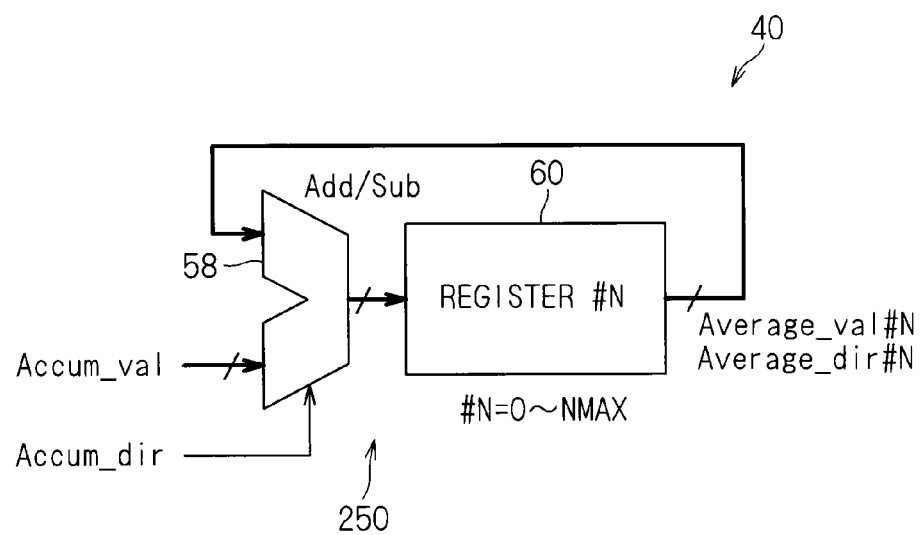

F I G. 1 6
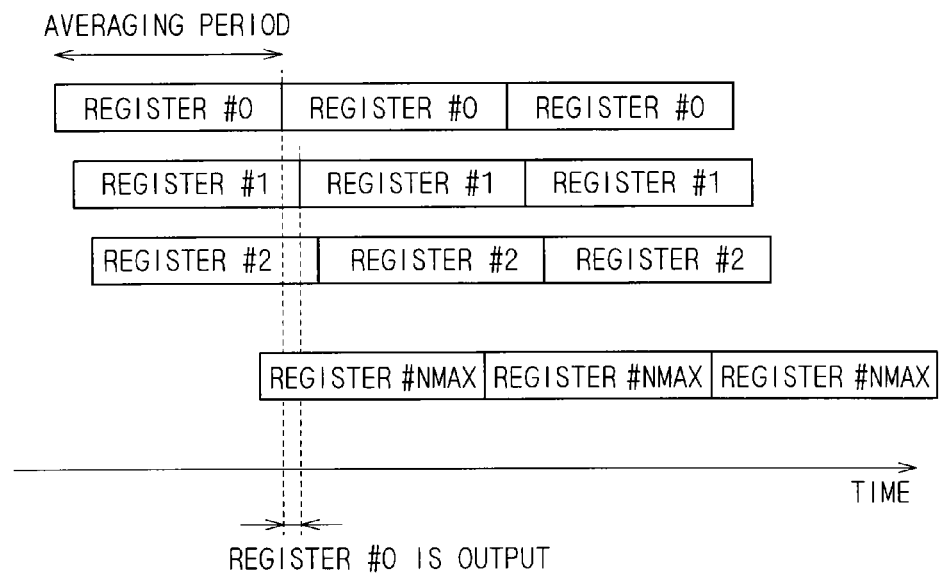

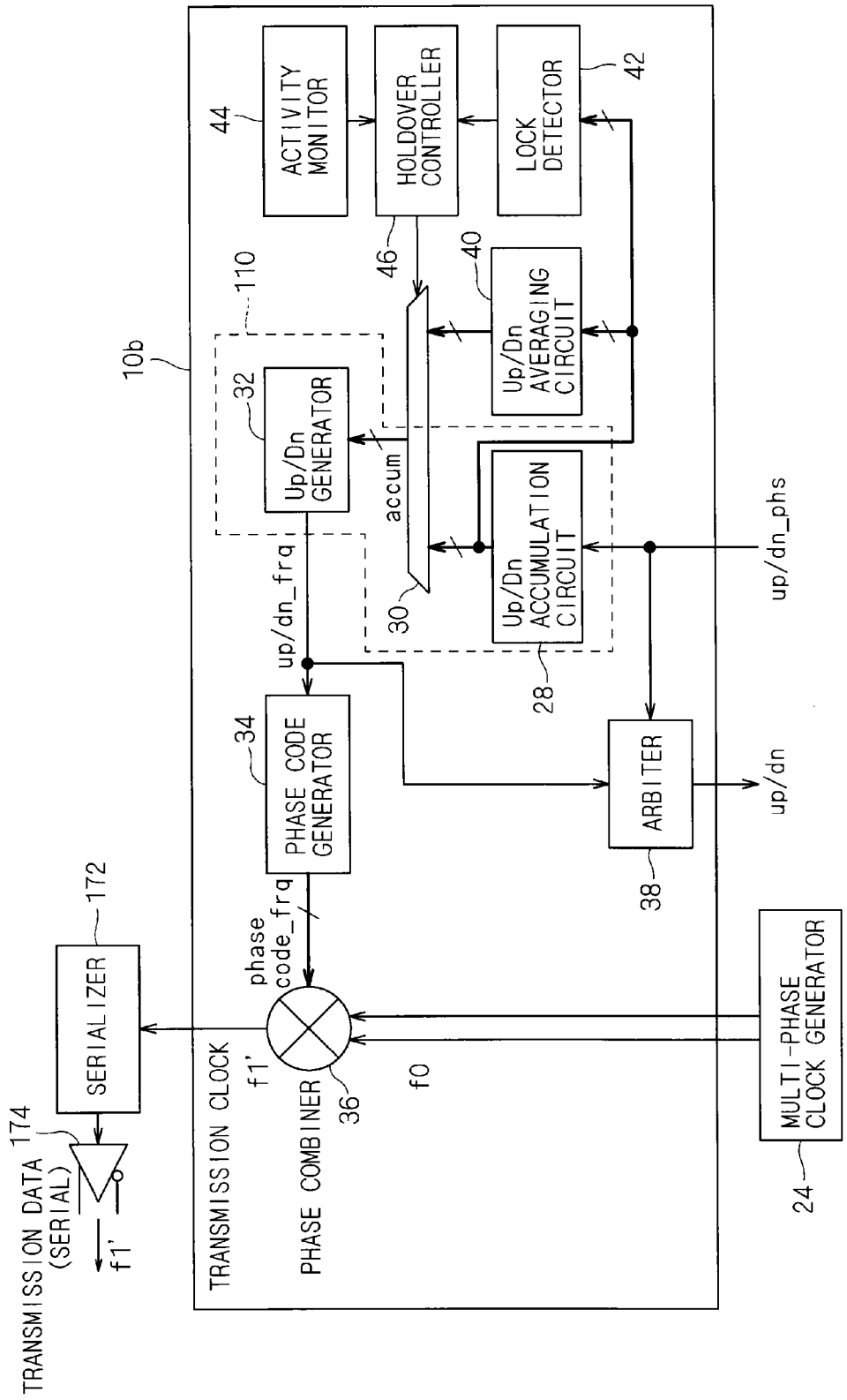

F I G . 2 0
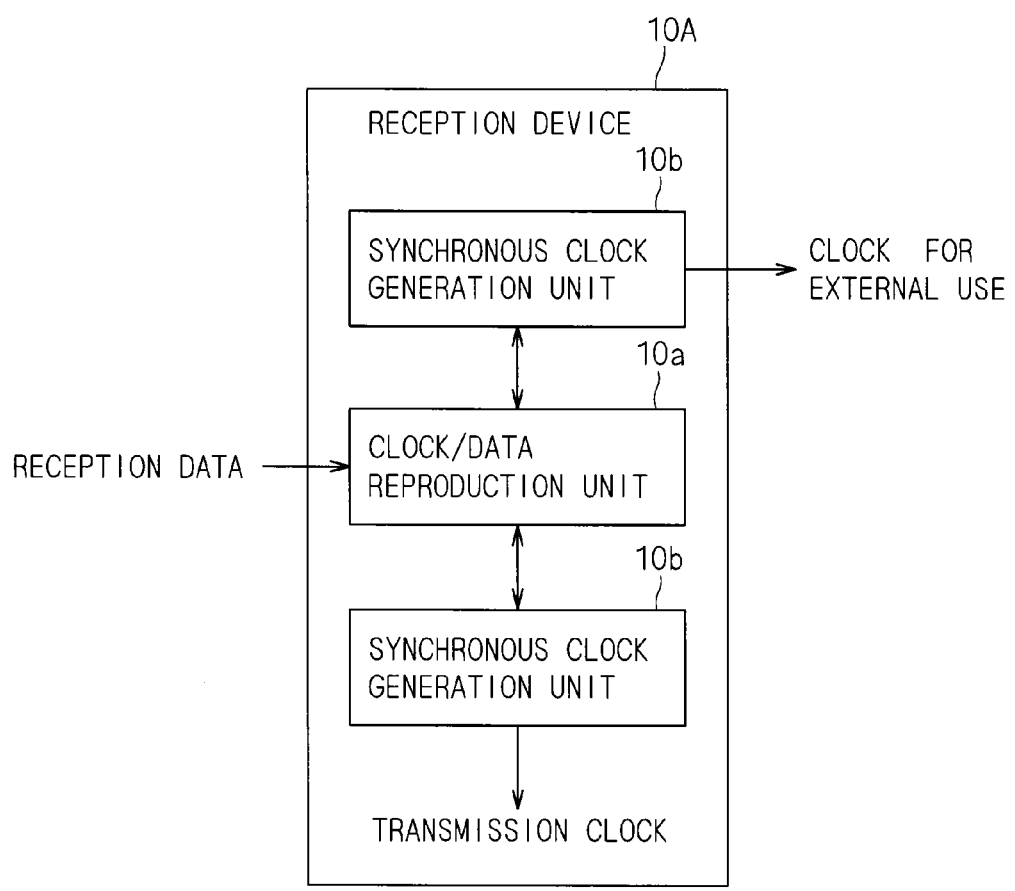

F I G . 2 6
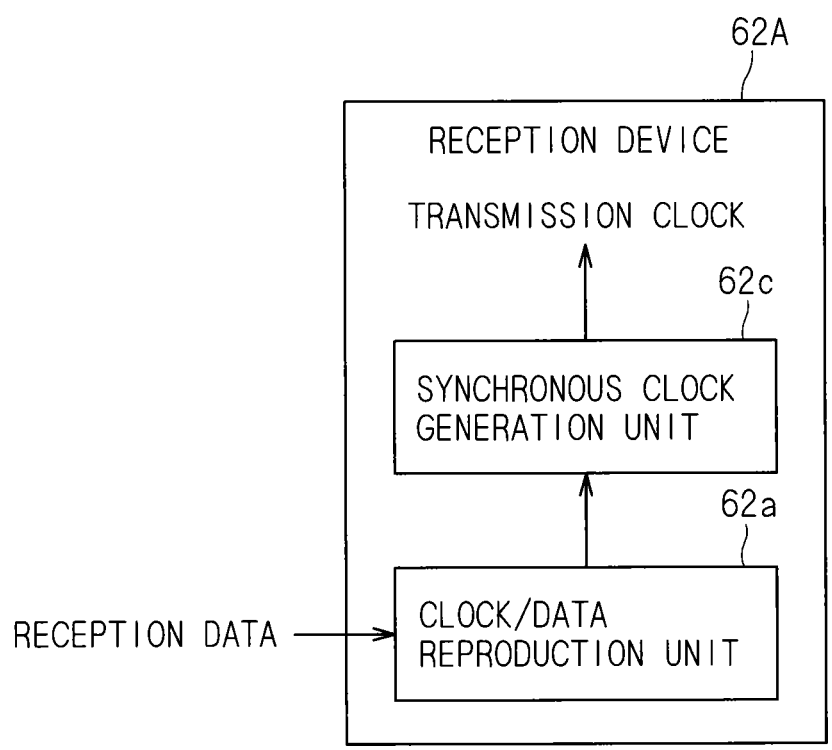

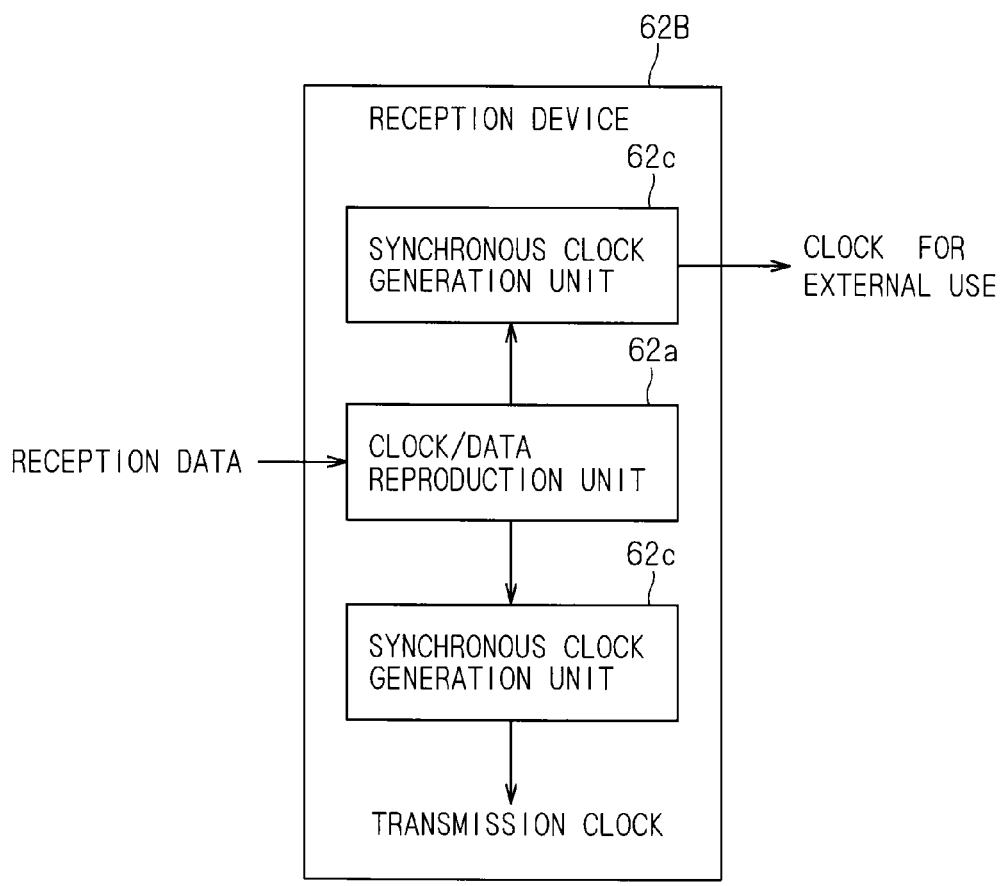
F I G . 2 9

RECEPTION DEVICE

BACKGROUND OF THE INVENTION

1. Field of the Invention

The present invention relates to a reception device.

2. Description of the Background Art

Japanese Patent Application Laid-Open No. 2007-201842 discloses a passive optical network (PON) system including a station-side terminating device (OLT: optical line terminal) and a line terminating device (ONU: optical network unit). In the PON system disclosed in Japanese Patent Application Laid-Open No. 2007-201842, the OLT generates a transmission signal synchronized with a clock signal which has a predetermined frequency and is synchronized with a reference clock signal for synchronization generated by a station-side reference clock source. Accordingly, the ONU reproduces a clock signal from the transmission signal from the OLT, converts a frequency of the clock signal into a predetermined frequency, and generates a reference clock signal for use in Ethernet (registered trademark) equipment.

Japanese Patent Application Laid-Open No. 2011-9984 discloses a gigabit Ethernet-passive optical network (GEPON) system including a station-side device and a terminal-side device. In the GEPON system disclosed in Japanese Patent Application Laid-Open No. 2011-9984, a station-side device uses a device clock generated from a network reference clock as an operation clock, generates transmission data by adding time stamp information to input data, generates correlation information representing a correlation between the network reference clock and the time stamp information, and multiplexes the generated correlation information into downlink data. The terminal-side device reproduces the network reference clock based on the time stamp information and the correlation information included in the transmission data transmitted from the station-side device.

Japanese Patent Application Laid-Open No. 2003-283332 discloses a synchronization circuit including a clock selector, a phase control unit, a phase information storage unit, and a frequency offset control unit. The clock selector outputs a selected clock having a desired phase from a multi-phase clock. The phase control unit outputs a phase control signal based on a comparison result of phases of input data and the selected clock. The phase information storage unit stores phase information from the phase control unit, and controls the clock selector. The frequency offset control unit outputs an offset control signal according to the number of phase control signal outputs, and outputs an offset control signal according to a cumulative number when the cumulative number of the phase control signal exceeds an activation threshold value.

Japanese Patent Application Laid-Open No. 2007-43460 discloses a bit synchronization circuit having an initial phase determination unit. The initial phase determination unit detects a variation point of a reception signal using a multi-phase clock during a preamble reception period of burst data, and outputs initial phase information including a phase number of a clock synchronized with the variation point.

U.S. Pat. No. 7,692,499 discloses a system including a phase-frequency comparator, a storage unit, an adaptive filter, and a digital control oscillator. The phase/frequency comparator detects an error between a reference clock and a feedback clock. The storage unit stores a model which predicts frequency fluctuation of a temperature-compensated crystal oscillator. The adaptive filter includes a loop filter and an algorithm for predicting frequency fluctuation based on a model, and generates a selected output signal based on filter data and prediction data. The digital control oscillator sets a phase of an output clock signal according to an output signal of the adaptive filter. The adaptive filter receives an error signal and outputs filter data in a normal time in which a reference clock is valid, and outputs prediction data in a holdover time in which a reference clock is invalid.

As disclosed in Japanese Patent Application Laid-Open Nos. 2007-201842 and 2011-9984, a reference clock (synchronous clock) can be generated using a clock reproduction unit provided in the ONU.

However, a reception data signal received by the ONU from the OLT is affected by fluctuation within the OLT or noise in a transmission process. In a data reproduction clock signal reproduced based on the reception data signal, frequency fluctuation is large (a cutoff frequency of jitter transfer characteristics from the reception data signal to the clock signal for reproducing data is too high). Therefore, the above-described reproduction clock signal cannot be used as a synchronous clock signal.

In addition, it is also necessary to use a clock signal (transmission clock signal) synchronized with an OLT-side clock signal in generation of a transmission signal to be transmitted to the OLT. The clock signal for reproducing data also cannot be used as a transmission clock signal because frequency fluctuation is too large.

In addition, as in U.S. Pat. No. 7,692,499, technology for supplying a synchronous clock signal for a holdover time based on data stored for a normal time is well known. However, in particular, as in Japanese Patent Application Laid-Open No. 2003-283332, when a clock signal of a desired phase is generated as a synchronous clock signal by performing selection from a multi-phase clock or mixing a multi-phase clock signal, data to be stored is not particularly obvious.

SUMMARY OF THE INVENTION

An object of the present invention is to provide technology capable of improving frequency stability of a synchronous clock signal to be synchronized with a reception data signal.

According to a first aspect of a reception device, the reception device includes: a clock/data reproduction unit which receives a reception data signal to generate a reception clock signal synchronized with the reception data signal and reproduces data from the reception data signal using the reception clock signal; and a synchronous clock generation unit generates a first synchronous clock signal which is synchronized with the reception data signal and of which frequency stability is high compared to the reception clock signal, the clock/data reproduction unit includes: a local clock source which generates a multi-phase local clock signal having a fixed frequency; and a first generation unit which generates the reception clock signal from the multi-phase local clock signal, the synchronous clock generation unit includes: a first phase setting circuit which generates a first phase setting signal; a first synchronous clock signal generator which generates the first synchronous clock signal having a phase set by the first phase setting signal from the multi-phase local clock signal; and a second generation unit which generates a second signal including a frequency component representing a frequency offset between the multi-phase local clock signal and the reception data signal by removing a phase fluctuation component representing phase fluctuation of the reception data signal from a first signal including the frequency component and the phase fluctuation component, and the first phase setting circuit updates the first phase setting signal according to the second signal.

In addition, in a second aspect of the reception device according to the above-described first aspect, the first generation unit includes: a second phase setting circuit which generates a second phase setting signal; a reception clock signal generator which generates the reception clock signal having the phase set by the second phase setting signal from the multi-phase local clock signal; and a first timing signal generation circuit which generates a first timing signal representing a direction in which the phase of the reception clock signal should be changed based on a result obtained by comparing a timing of an edge of the reception data signal to a timing of an edge of the reception clock signal, the second generator includes: a first accumulation circuit which holds a first cumulative value obtained by accumulating the first timing signal serving as the first signal; and a second timing signal generation circuit which generates a second timing signal serving as the second signal according to the first cumulative value, said second timing signal representing a direction in which the phase of the reception clock signal should be changed, the second phase setting circuit updates the second phase setting signal according to both the first timing signal and the second timing signal, and the first phase setting circuit updates the first phase setting signal according to only the second timing signal between the first timing signal and the second timing signal.

In addition, in a third aspect of the reception device according to the above-described first aspect, the first generation unit includes: a second phase setting circuit which generates a second phase setting signal; a reception clock signal generator which generates the reception clock signal having the phase set by the second phase setting signal from the multi-phase local clock signal; and a first timing signal generation circuit which generates a first timing signal representing a direction in which the phase of the reception clock signal should be changed based on a result obtained by comparing a timing of an edge of the reception data signal to a timing of an edge of the reception clock signal, the second phase setting circuit updates the second phase setting signal according to the first timing signal, the second generation unit includes: a third phase setting circuit which generates a third phase setting signal updated by following up an update of the second phase setting signal serving as the first signal; a comparison circuit which generates a comparison timing signal representing a direction in which the third phase setting signal should be updated based on a result obtained by comparing the second phase setting signal and the third phase setting signal; a first accumulation circuit which holds a first cumulative value obtained by accumulating the comparison timing signal; and a second timing signal generation circuit which generates a second timing signal serving as the second signal according to the first cumulative value, said second timing signal representing a direction in which the third phase setting signal should be updated, the third phase setting circuit updates the third phase setting signal according to both the comparison timing signal and the second timing signal, and the first phase setting circuit updates the first phase setting signal according to only the second timing signal between the comparison timing signal and the second timing signal.

In addition, in a fourth aspect of the reception device according to either one of the above-described second and third aspects, the second timing signal generation circuit generates the second timing signal so that the phase of the first synchronous clock signal is varied at a speed according to the first cumulative value.

In addition, in a fifth aspect of the reception device according to the above-described fourth aspect, the second timing signal generation circuit includes a first cumulative adder which receives the first cumulative value at a fixed time interval and generates a first cumulative addition value by cumulatively adding the received first cumulative value, subtracts a first predetermined value from the first cumulative addition value every time the first cumulative addition value reaches the first predetermined value, and generates the second timing signal.

In addition, in a sixth aspect of the reception device according to any one of the above-described second to fifth aspects, the synchronous clock generation unit further includes: a storage circuit which stores the first cumulative value held by the first accumulation circuit; and a data signal stop determination unit which supplies the first cumulative value stored by the storage circuit to the second timing signal generation circuit instead of supplying the first cumulative value from the first accumulation circuit to the second timing signal generation circuit when the data signal stop determination unit determines that the reception data signal is stopped.

In addition, in a seventh aspect of the reception device according to the above-described sixth aspect, the data signal stop determination unit includes at least one of: a first determination circuit which determines that the reception data signal is stopped when a state transition rate of the reception data signal is less than a first threshold value; and a second determination circuit which determines that the reception data signal is stopped when a change rate of the first cumulative value exceeds a second threshold value.

In addition, in an eighth aspect of the reception device according to either one of the above-described sixth and seventh aspects, the first timing signal generation circuit generates an invalid signal when a relationship between a timing of an edge of the reception data signal and a timing of an edge of the reception clock signal is in an invalid range, and the data signal stop determination unit includes a third determination circuit which determines that the reception data signal is stopped when a generation rate of the invalid signal exceeds a third threshold value.

In addition, in a ninth aspect of the reception device according to any one of the above-described second to eighth aspects, the reception device constitutes an line terminating device which receives the reception data signal generated by a reference device from an station-side terminating device, and the reception device supplies the first synchronous clock signal to a subscriber-side device which is caused to operate in synchronization with the reference device.

In addition, in a tenth aspect of the reception device according to any one of the above-described second to eighth aspects, the reception device constitutes an line terminating device which receives the reception data signal from an station-side terminating device, and the reception device further includes: a transmission circuit which transmits a transmission data signal generated based on the first synchronous clock signal to the station-side terminating device.

In addition, in an eleventh aspect of the reception device according to the above-described third aspect, the reception device further includes a second accumulation circuit which holds a second cumulative value obtained by accumulating the first timing signal; a third timing signal generation circuit which generates a third timing signal according to the second cumulative value, the third timing signal representing a direction in which the phase of the reception clock signal should be changed; a fourth phase setting circuit which generates a fourth phase setting signal; and a second synchronous clock signal generator which generates, from the multi-phase local clock signal, a second synchronous clock signal which is synchronized with the reception data signal and has a phase set by the fourth phase setting signal, the second phase setting circuit updates the second phase setting signal according to both the first timing signal and the third timing signal, and the fourth phase setting circuit updates the fourth phase setting signal according to only the third timing signal between the first timing signal and the third timing signal.

In addition, in a twelfth aspect of the reception device according to the above-described eleventh aspect, the third timing signal generation circuit generates the third timing signal so that the phase of the second synchronous clock signal is varied at a speed according to the second cumulative value.

In addition, in a thirteenth aspect of the reception device according to the above-described twelfth aspect, the third timing signal generation circuit includes a second cumulative adder which receives the second cumulative value at a fixed time interval and generates a second cumulative addition value by cumulatively adding the received second cumulative value, subtracts a second predetermined value from the second cumulative addition value every time the second cumulative addition value reaches the second predetermined value, and generates the third timing signal.

In addition, in a fourteenth aspect of the reception device according to any one of the above-described eleventh to thirteenth aspects, the reception device constitutes an line terminating device which receives the reception data signal generated by a reference device from an station-side terminating device, and the reception device further includes a transmission circuit, which transmits a transmission data signal generated based on the first synchronous clock signal to the station-side terminating device, and supplies the second synchronous clock signal to a subscriber-side device which is caused to operate in synchronization with the reference device.

In addition, in a fifteenth aspect of the reception device according to the above-described fourteenth aspect, the first timing signal generation circuit, the second phase setting circuit, the comparison circuit, the first accumulation circuit, the second timing signal generation circuit, and the first phase setting circuit have first low pass filter characteristics, which prevent a component of a first cutoff frequency and more, in phase fluctuation included in the reception data signal, from being transferred to the first synchronous clock signal, and the first timing signal generation circuit, the second accumulation circuit, the third timing signal generation circuit, and the fourth phase setting circuit have second low pass filter characteristics, which prevent a component of a second cutoff frequency and more, in the phase fluctuation included in the reception data signal, from being transferred to the second synchronous clock signal, the second cutoff frequency being lower than the first cutoff frequency.

Thus, it is possible to improve frequency stability of a synchronous clock signal.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a conceptual diagram illustrating a configuration of a PON system;

FIGS. 3A, 3B, and 3C are timing diagrams each illustrating a relationship between a reception data signal and a sampling clock signal;

FIG. 5A is a graph illustrating a relationship between a phase $\phi1$ of a reception data signal and a phase $\phi1'$ of a sampling clock signal (reception clock signal) and FIG. 5B is a conceptual diagram illustrating the relationship;

FIG. 7 is a block diagram illustrating a configuration of a reception device according to a first preferred embodiment;

FIGS. 13A and 13B are timing diagrams of a Gen_out signal and an Up/Dn_out signal;

FIG. 14 is a conceptual diagram illustrating an Up/Dn averaging circuit;

FIG. 15 is a block diagram illustrating a configuration of the Up/Dn averaging circuit;

FIG. 16 is a conceptual diagram illustrating a state in which parallel processing is performed in a plurality of cumulative adders;

FIG. 19 is a block diagram illustrating part of a configuration of a modified example of the reception device according to the first preferred embodiment;

FIG. 20 is a block diagram illustrating a configuration of a modified example of the reception device according to the first preferred embodiment;

FIG. 26 is a block diagram illustrating a configuration of a modified example of the reception device according to the second preferred embodiment;

FIG. 29 is a block diagram illustrating a configuration of a modified example of the reception device according to the second preferred embodiment;

DESCRIPTION OF THE PREFERRED EMBODIMENTS

<Regarding PON System>

FIG. 1 is a conceptual diagram illustrating a configuration of the PON system. The PON system illustrated in FIG. 1, for example, is used in a portable telephone network, and includes a base station controller (BSC), an OLT, a plurality of ONUs, and a plurality of base transceiver stations (BTSs).

The BSC is connected to a reference device such as an exchange installed in a telephone station via a portable telephone core network. The OLT is connected to the BSC, and a plurality of (three in FIG. 1) ONUs are connected to the OLT. Each ONU is connected to one BTS.

In the above-described PON system, for example, when a data signal is transmitted from the OLT side to the ONU side, the data signal reaches from the reference device such as an exchange to the BSC via the core network and then reaches from the BSC to the OLT. Accordingly, the data signal reaches from the OLT to the plurality of ONUs, and then is transmitted from each ONU to the BTS corresponding to the ONU. Because a connection between the BTS and each subscriber's portable telephone (not illustrated), which is a subscriber-side device, is made through wireless communication, the BTS wirelessly connected to the portable telephone is sequentially changed in association with movement of the subscriber, that is, the portable telephone.

The reception device according to this preferred embodiment, for example, is a reception device provided in an ONU of the above-described PON system. Before description of the reception device according to this preferred embodiment, a comparison target reception device to be compared to the reception device according to this preferred embodiment will first be described.

<Comparison Target Reception Device>

Figure 2:
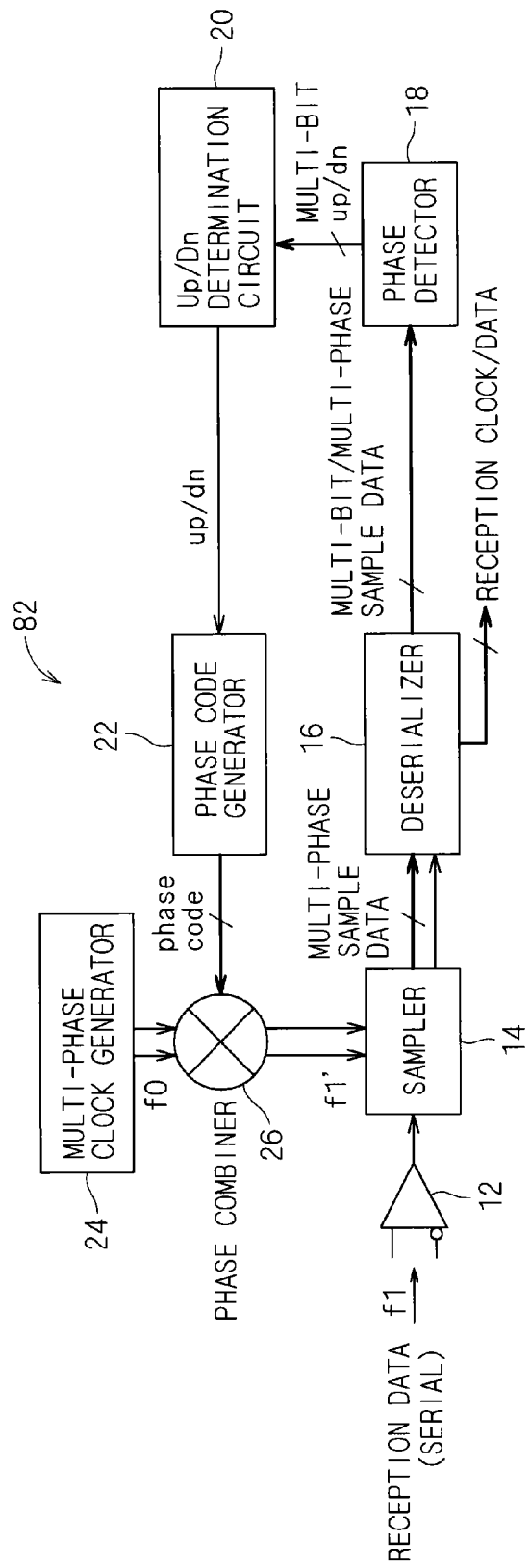
FIG. 2 is a block diagram illustrating a configuration of a comparison target reception device.

FIG. 2 is a block diagram illustrating a configuration of a comparison target reception device 82. The reception device 82 includes an input buffer 12, a sampler 14, a deserializer 16, a phase detector 18, an Up/Dn determination circuit 20, a phase code generator 22, a multi-phase clock generator 24, and a phase combiner 26. These circuit elements constitute a clock/data recovery unit (clock/data reproduction unit). The clock/data recovery unit generates a reception clock signal synchronized with a reception data signal, from the reception data signal received from the OLT. Accordingly, the clock/data recovery unit reproduces data (reception data) from the reception data signal using the generated reception clock signal.

The multi-phase clock generator 24 is a local clock source which generates multi-phase local clock signals each having a different phase at a predetermined frequency f0. In addition, a phase difference between any two local clock signals of which phases are adjacent to each other is $2\pi/N1$ (N1 is the number of local clock signals). The multi-phase local clock signal is supplied to the phase combiner 26.

The phase combiner 26 generates, from the multi-phase local clock signal, a multi-phase sampling clock signal including a reception clock signal having a phase set by a phase code signal, which is a phase code supplied from the phase code generator 22. A phase difference between any two sampling clock signals of which phases are adjacent to each other is $2\pi/N2$ (N2 is the number of sampling clocks). In addition, the resolution of a phase shift in the phase combiner 26 is $2\pi/M$ (M is the number of steps of the phase code in the phase code generator 22). The multi-phase sampling clock signal is supplied to the sampler 14.

The sampler 14 samples a reception data signal (serial) of an arbitrary phase supplied via the input buffer 12 at the timing of a phase (edge) of each of multi-phase sampling clock signals. That is, multi-phase sample data signals, the number of which is corresponding to the number of phases of a multi-phase sampling clock signal, and a reception clock signal having a phase set by a phase code signal are output for every input period (one unit interval (1UI)) of a 1-bit reception data signal from the sampler 14. The multi-phase sample data signal is supplied to the deserializer 16.

The deserializer 16 converts a multi-phase sample data signal of a period of a predetermined number of UIs into parallel data to generate a multi-bit/multi-phase sample data signal. The multi-bit/multi-phase sample data signal is supplied to the phase detector 18. In addition, a reception clock signal supplied from the sampler 14 and a reception data signal obtained by converting a sample data signal obtained by sampling the reception data signal through the reception clock signal into parallel data are output from the deserializer 16.

The phase detector 18 detects a transition edge timing of the reception data signal from a variation position of a logic value of a multi-bit/multi-phase sample data signal of a predetermined number of UI periods. Thereby, the phase detector 18 can compare a timing of an edge of the reception data signal to a timing of an edge of the reception clock signal. In order to sample the reception data signal at an accurate timing, the phase detector 18 generates, based on the comparison result, a multi-bit up/dn signal which is phase information (timing signal) indicating which direction (up (early) or do (late)) should a phase of the reception clock signal (sampling clock signal) be moved in with respect to a phase of the reception data signal. The multi-bit up/dn signal is supplied to the Up/Dn determination circuit 20.

The reception data signal is a signal generated using a clock signal of a frequency f1 in the OLT. The frequency (hereinafter referred to as the "frequency of the reception clock signal") f1 of the clock signal used for generating the reception data signal is specified by a standard. Although the frequency f0 of the local clock signal is set to be substantially consistent with f1, it is not possible for the frequency f0 to be actually completely consistent with f1. That is, there is a frequency offset (frequency error) between the two frequencies. Thus, the phase relationship between the reception data signal and the reception clock signal set by one phase code signal is gradually shifted in one direction (a direction in which the phase is late or early) due to the frequency offset between f0 and f1. In order to solve the phase shift, it is necessary to vary a phase code signal and cyclically shift the phase of the reception clock signal in a direction opposite the phase shift between the two frequencies.

FIG. 3A illustrates an ideal case in which the phase (the phase of a rising edge of the sampling clock signal in FIG. 3A) of the sampling clock signal (reception clock signal) is in the center between the transitions of the reception data signal. As described above, when the phase of the sampling clock signal is in the center between the transitions of the reception data signal, it is possible to most reliably reproduce data from the reception data signal.

On the other hand, in FIG. 3B, the phase of the sampling clock signal is at a position at which the phase of the sampling clock signal is earlier than the center between the transitions of the reception data signal. In a state in which the phase code signal is fixed when the frequency f1 of the reception data signal is lower than the frequency f0 of the local clock signal, the phase of the reception data signal is late and the phase of the sampling clock signal is relatively early. In this case, as indicated by arrows facing right in FIG. 3B, it is necessary to update the phase code signal so that a shift is made in a direction in which the phase of the sampling clock signal becomes late.

On the other hand, in FIG. 3C, the phase of the sampling clock signal is at a position later than the center between the transitions of the reception data signal. In a state in which the phase code signal is fixed when the frequency f1 of the reception data signal is higher than the frequency f0 of the local clock signal, the phase of the reception data signal is advanced and the phase of the sampling clock signal becomes relatively late. In this case, as indicated by arrows facing left in FIG. 3C, it is necessary to update the phase code signal so that a shift is made in a direction in which the phase of the sampling clock signal is early.

As described above, by varying the phase code signal so that the phase of the sampling clock signal with respect to the phase of the reception data signal is uniformly maintained, the frequency f1' determined by the timing of the edge of the sampling clock signal is separated from the frequency f0 of the local clock signal and substantially consistent with the frequency f1 of the reception data signal. Next, a process of varying the phase code signal as described above will be described.

The Up/Dn determination circuit 20 generates an up/dn signal which is phase information (a timing signal) indicating a direction in which the phase of the reception clock signal should be changed based on the multi-bit up/dn signal. Here, the multi-bit up/dn signal is phase information indicating which direction should the phase of the reception clock signal be moved in, the reception clock signal being based on a result obtained by comparing the timing of the edge of the reception data signal to the timing of the edge of the reception clock signal over a period of a predetermined number of latest UIs. The Up/Dn determination circuit 20 improves the precision of the up/dn signal by performing a filtering process based on phase information of a period of a plurality of UIs. In an algorithm of the filtering process, it is possible to adopt a majority voting scheme, a unanimous voting scheme, or the like. The up/dn signal is supplied to the phase code generator 22.

In order to solve the shift of the phase between the reception data signal and the reception clock signal, the phase code generator 22 generates a phase code signal which is a phase code (phase setting signal) variable in a predetermined step in a direction determined by the up/dn signal. One step (phase step) of the phase code in the phase code generator 22 is consistent with the resolution of the phase shift in the phase combiner 26. The phase code signal is supplied to the phase combiner 26.

The phase combiner 26 generates a multi-phase sampling clock signal including the reception clock signal of the phase (the phase specified by the phase code signal) set by the phase code signal from the multi-phase local clock signal. For example, when the up signal is output from the Up/Dn determination circuit 20, the phase code signal is updated so that the phase of the multi-phase sampling clock signal including the reception clock signal becomes early. In addition, when the do signal is output from the Up/Dn determination circuit 20, the phase code signal is updated so that the phase of the multi-phase sampling clock signal including the reception clock signal becomes late.

In the reception device 82, the above-described operation is iteratively performed and hence the phase of the reception clock signal is maintained in the center between the transitions of the reception data signal. Thereby, it is possible to synchronize the reception clock signal with the reception data signal and sample the reception data signal at an accurate timing through a reception clock signal.

A process of uniformly maintaining the relationship between the phase of the reception clock signal and the phase of the reception data signal through an update of the phase code signal will be further described.

Figure 4A:
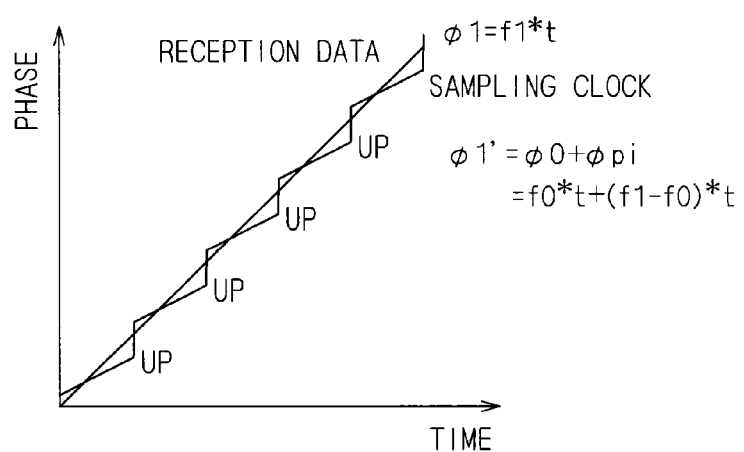
FIGS. 4A and 4B are graphs each illustrating a relationship between a phase $\phi1$ of a reception data signal and a phase $\phi1'$ of a sampling clock signal (reception clock signal)
Figure 4B:
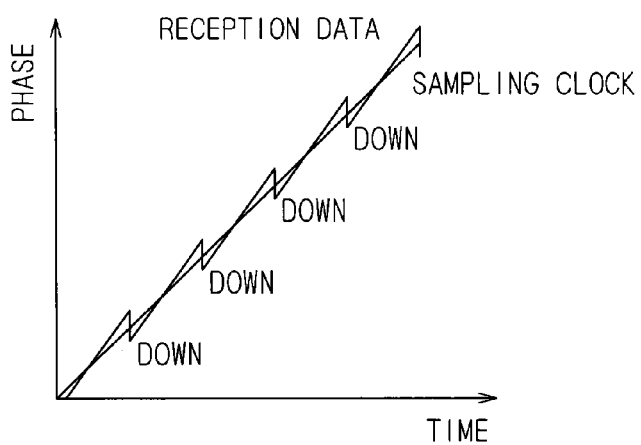

FIGS. 4A and 4B are graphs each illustrating a state in which the phase combiner 26 varies a phase $\phi1'$ of a sampling clock signal (reception clock signal) to be substantially consistent with a phase $\phi1$ of a reception data signal. In these graphs, the vertical axis represents a phase and the horizontal axis represents time.

FIG. 4A is an example in which the frequency f0 of the local clock signal is significantly lower than the frequency f1 of the reception data signal.

A linear graph illustrated in FIG. 4A represents a relationship between the phase $\phi1$ of the reception data signal and the time t. The slope of this graph represents the frequency f1 of the reception data signal. The relationship of Frequency f1=$\Delta$Phase/$\Delta$Time is given. The phase $\phi1$ of the reception data signal is proportional to the time and increases with the passage of time based on a phase of the reception data signal of a certain time. That is, the relationship of Phase $\phi1$ of Reception Data Signal=f1*t is given.

When the frequency f0 of the local clock signal is significantly lower than the frequency f1 of the reception data signal, the phase $\phi1$ of the reception data signal is gradually earlier than the phase $\phi1'$ of the sampling clock signal with the passage of time. Thus, the Up/Dn determination circuit 20 cyclically generates an up signal so as to cause the phase $\phi1'$ of the sampling clock signal to follow up the phase $\phi1$ of the reception data signal. The phase code generator 22 receiving the supply of the up signal updates the phase code signal, and the phase combiner 26 cyclically advances the phase $\phi1'$ of the sampling clock signal (UP).

The stepwise graph illustrated in FIG. 4A illustrates the relationship between the phase $\phi1'$ of the sampling clock signal and the time t. The phase combiner 26 can change the phase $\phi1'$ of the sampling clock signal only in units of the resolution of a phase shift. Therefore, the phase $\phi1'$ of the sampling clock signal is advanced by a phase corresponding to one unit of the resolution of the phase shift for every predetermined time (UP).

As described above, when the frequency f0 of the local clock signal is significantly lower than the frequency f1 of the reception data signal, an UP operation is configured to be continuously executed.

Here, the phase of the sampling clock signal is represented by $\phi0$ when no phase code signal is updated, and variation of the phase due to the update of the phase code signal is represented by $\phi pi$. Then, the phase $\phi1'$ of the sampling clock signal is a sum of $\phi0$ and $\phi pi$, and the relationship of $\phi1'=\phi0+\phi pi=f0*t+(f1-f0)*t$ is given.

Next, FIG. 4B is an example in which the frequency f0 of the local clock signal is significantly higher than the frequency f1 of the reception data signal.

In this case, the phase $\phi1'$ of the sampling clock signal is gradually earlier than the phase $\phi1$ of the reception data signal with the passage of time. Thus, the Up/Dn determination circuit 20 cyclically generates a dn signal so as to cause the phase $\phi1'$ of the sampling clock signal to follow up the phase $\phi1$ of the reception data signal. The phase code generator 22 receiving the supply of the dn signal updates the phase code signal, and the phase combiner 26 cyclically delays the phase $\phi1'$ of the sampling clock signal (DOWN). That is, the phase $\phi1'$ of the sampling clock signal is delayed by a phase corresponding to one unit of the resolution of the phase shift for every predetermined time (DOWN).

As described above, when the frequency f0 of the local clock signal is significantly higher than the frequency f1 of the reception data signal, a DOWN operation is configured to be continuously executed.

Subsequently, FIG. 5A is a graph illustrating a state in which the phase combiner 26 varies the phase $\phi1'$ of the sampling clock signal (reception clock signal) with respect to the phase $\phi1$ of the reception data signal, and FIG. 5B is a conceptual diagram illustrating the state.

FIG. 5A is an example in which the frequency f0 of the local clock signal is substantially equal to the frequency f1 of the reception data signal.

In this case, as illustrated in FIG. 5B, the relationship of Frequency of Reception Data Signal, f1=f0+(f1−f0) is given. However, because a value of (f1−f0) is not exactly 0, the phase $\phi1$ of the reception data signal is set to be earlier or later than the phase $\phi1'$ of the sampling clock signal with the passage of time. Thus, the Up/Dn determination circuit 20 generates the up or dn signal so as to cause the phase $\phi1'$ of the sampling clock signal to follow up the phase $\phi1$ of the reception data signal. The phase code generator 22 receiving the supply of the up/dn signal updates the phase code signal, and the phase combiner 26 advances (UP) or delays (DOWN) the phase $\phi1'$ of the sampling clock signal. Incidentally, the phase combiner 26 can only change the phase $\phi1'$ of the sampling clock signal in the units of the resolution of the phase shift. Thus, when (f1−f0) is small, the up signal and the do signal are alternately generated as illustrated in FIG. 5(A). Also, the phase $\phi1'$ of the sampling clock signal may be continuously advanced (UP) or delayed (DOWN) depending on the value of (f1−f0).

As described above, in the comparison target reception device 82, a reception clock signal synchronized with a reception data signal is generated. When there is phase fluctuation in the reception data signal because the phase of the reception clock signal is controlled to have a uniform relationship with the phase of the reception data signal, phase fluctuation also occurs in the reception clock signal. That is, this means that the frequency stability of the reception clock signal is not very high.

On the other hand, in the reception device, a synchronous clock signal which is synchronized with the reception data signal and has small phase fluctuation, that is, has high frequency stability may be necessary.

For example, in the above-described portable telephone network, times in all devices constituting the PON system needs to be consistent at a predetermined precision specified in advance. As described above, although the BTS wirelessly connected to the portable telephone is changed in association with movement of the portable telephone, it is not possible for the portable telephone to operate normally when the time is changed at the moment at which the BTS has been changed. In addition, it is necessary for the time of the BTS to be consistent with that of the ONU. Ultimately, it is necessary to cause the times in all devices of the PON system to be consistent with a predetermined time (time 1).

In order to cause the times in all the devices constituting the PON system to be consistent with each other, technology of Synchronous Ethernet (registered trademark) is used in the PON system. Ethernet (registered trademark) of the related art is technology developed for an asynchronous application. It is difficult to use Ethernet (registered trademark) of the related art in an application in which synchronization is necessary. Synchronous Ethernet (registered trademark) is technology in which Ethernet (registered trademark) is changed for use in an application in which synchronization is necessary.

In the PON system, time synchronization between all devices can be implemented in an application in which synchronization is necessary using Synchronous Ethernet (registered trademark). In order to implement the time synchronization, it is necessary to cause a frequency of a clock signal for use in all the devices to be consistent with a predetermined frequency freq1 at a predetermined precision specified in advance. Thus, the reception device to be used in Synchronous Ethernet is required to have a frequency consistent with a frequency of a reception data signal and generate a synchronous clock signal with high frequency stability.

Because the reception clock signal generated by the comparison target reception device 82 is a type of synchronous clock signal synchronized with the reception data signal, but the frequency stability is not very high, it is difficult to use the generated reception clock signal as a synchronous clock signal with high frequency stability.

A reception device capable of generating a synchronous clock signal with high frequency stability synchronized with the reception data signal will be described in this preferred embodiment.

<Requirement Specification of Synchronous Clock Signal>

Figure 6:
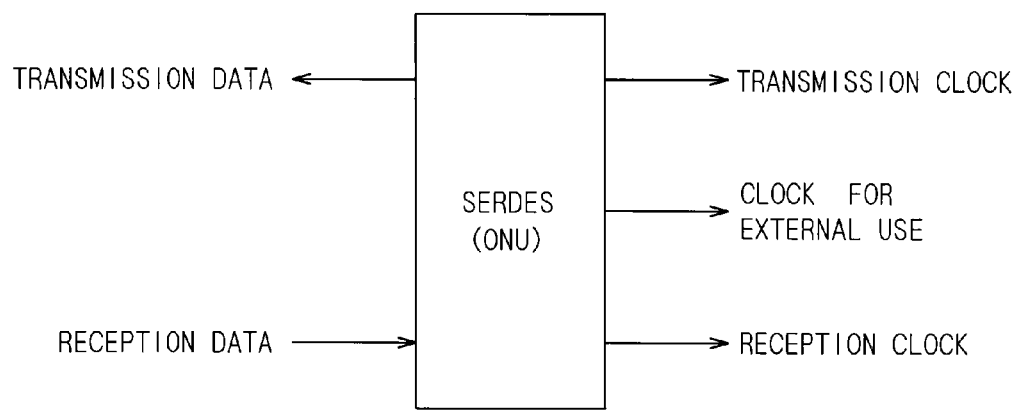
FIG. 6 is a conceptual diagram illustrating a serializer/deserializer (SerDes)

Here, the requirement specification for the synchronous clock signal used in the reception device provided in the ONU will be described. The reception device includes a serializer/deserializer (SerDes) that generates three types of synchronous clock signals synchronous with the reception data signal from the reception data signal received from the OLT. As illustrated in FIG. 6, the SerDes generates a reception clock signal, a clock signal for external use, and a transmission clock signal as the synchronous clock signal.

The reception clock signal is a timing clock for sampling the reception data signal received from the OLT. One requirement specification of the reception clock signal is as follows.

(R1) Jitter Tolerance Specification

The jitter tolerance specification specifies a range in which a frequency fluctuation component included in a data signal (clock signal) of the OLT is allowed. If the frequency fluctuation component included in the data signal of the OLT is in the tolerable range, the reception data signal is determined to be normal. Therefore, even when the reception data signal is normal, there is a certain degree of a frequency fluctuation component in the reception clock signal.

Subsequently, the clock signal for external use is a timing clock for transmitting and receiving Synchronous Ethernet (registered trademark) data between the ONU and the BTS. The clock signal for external use generated by the reception device of the ONU is transmitted to the BTS. The requirement specification of the clock signal for external use includes the following.

(S1) Frequency

The clock signal for external use has the same frequency as the reception clock signal generated from the reception data signal.

(S2) Transmission Specification of Jitter/Wander

A frequency fluctuation component is included in a data signal of the OLT (a reception data signal of the ONU). The frequency fluctuation component is classified into jitter/wander according to a frequency range. For example, the jitter is a fluctuation component of a frequency of 10 Hz or more, and the wander is a fluctuation component of a frequency of less than 10 Hz.

The transmission specification of the jitter/wander specifies a range of the frequency fluctuation component included in the clock signal for external use to be transferred from the OLT to the BTS via the ONU. In order to suppress the range of the frequency fluctuation component, a path of generation of the clock signal for external use has characteristics of a low pass filter. A cutoff frequency of the low pass filter, for example, is 1 Hz.

(S3) Accuracy of Frequency During Holdover

The accuracy of the frequency of the clock signal for external use during the holdover to be described in the next requirement specification S4 is specified.

(S4) Holdover

The holdover is a process to be performed when anything abnormal occurs in the data signal of the OLT and it is judged that any clock signal for external use must not be generated from the data signal of the OLT inside the ONU. The ONU holds information of the data signal of the OLT having a certain stable frequency when the data signal of the OLT is normal, and generates the clock signal for external use from the information of the data signal of the OLT held inside the ONU instead of the data signal received from the OLT when the data signal of the OLT is abnormal.

Also, the reception clock signal is not compatible with the requirement specification S2 of the clock signal for external use. Thus, it is difficult to directly use the reception clock signal as the clock signal for external use. Ultimately, the transmission clock signal is a timing clock for transmitting a transmission data signal from the ONU to the OLT. The requirement specification of the transmission clock signal includes the following.

(T1) Frequency

The transmission clock signal has the same frequency as the reception clock signal generated from the reception data signal as in the requirement specification S1 of the clock signal for external use.

(T2) Transfer Specification of Jitter

The transfer specification of the jitter is specified to be similar to the requirement specification S2 of the clock signal for external use. The characteristics of the low pass filter are also provided in the path of generation of the transmission clock signal. However, the cutoff frequency is different from the cutoff frequency of the low pass filter for satisfying S2, and, for example, becomes 1 MHz.

Also, the requirement specification S2 of the clock signal for external use is different from the requirement specification T2 of the transmission clock signal. Thus, the transmission clock signal has a difficulty to apply as the clock signal for external use, according to the degree of the frequency stability.

First Preferred Embodiment

Next, a reception device 10 according to the first preferred embodiment will be described in detail. The reception device 10 of this preferred embodiment constitutes an line terminating device (ONU) which receives a reception data signal generated by a reference device such as an exchange in a portable telephone network from an station-side terminating device (OLT). The reception device 10 supplies a clock signal for external use to a subscriber-side device of the portable telephone or the like which is caused to operate in synchronization with the reference device.

FIG. 7 is a block diagram illustrating a configuration of the reception device 10. The reception device 10 illustrated in FIG. 7 generates a clock signal for external use from a reception data signal. The reception device 10 includes a clock/data reproduction unit 10a and a synchronous clock generation unit 10b. The clock/data reproduction unit 10a receives the reception data signal, generates a reception clock signal synchronized with the reception data signal, and reproduces data from the reception data signal using the reception clock signal. The synchronous clock generation unit 10b generates a clock signal for external use synchronized with reception data. Frequency stability of the clock signal for external use is higher than that of the reception clock signal.

Figure 8:
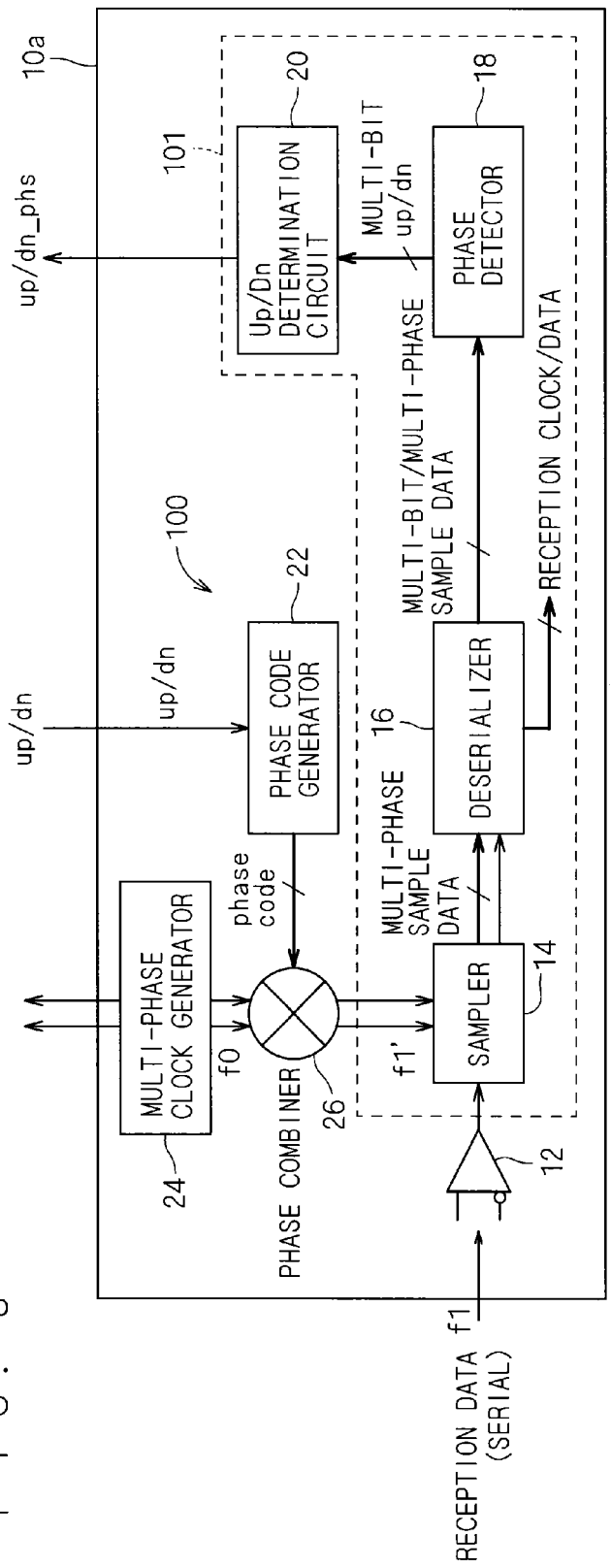
FIG. 8 is a block diagram illustrating a configuration of a clock/data reproduction unit according to the first preferred embodiment.
Figure 9:
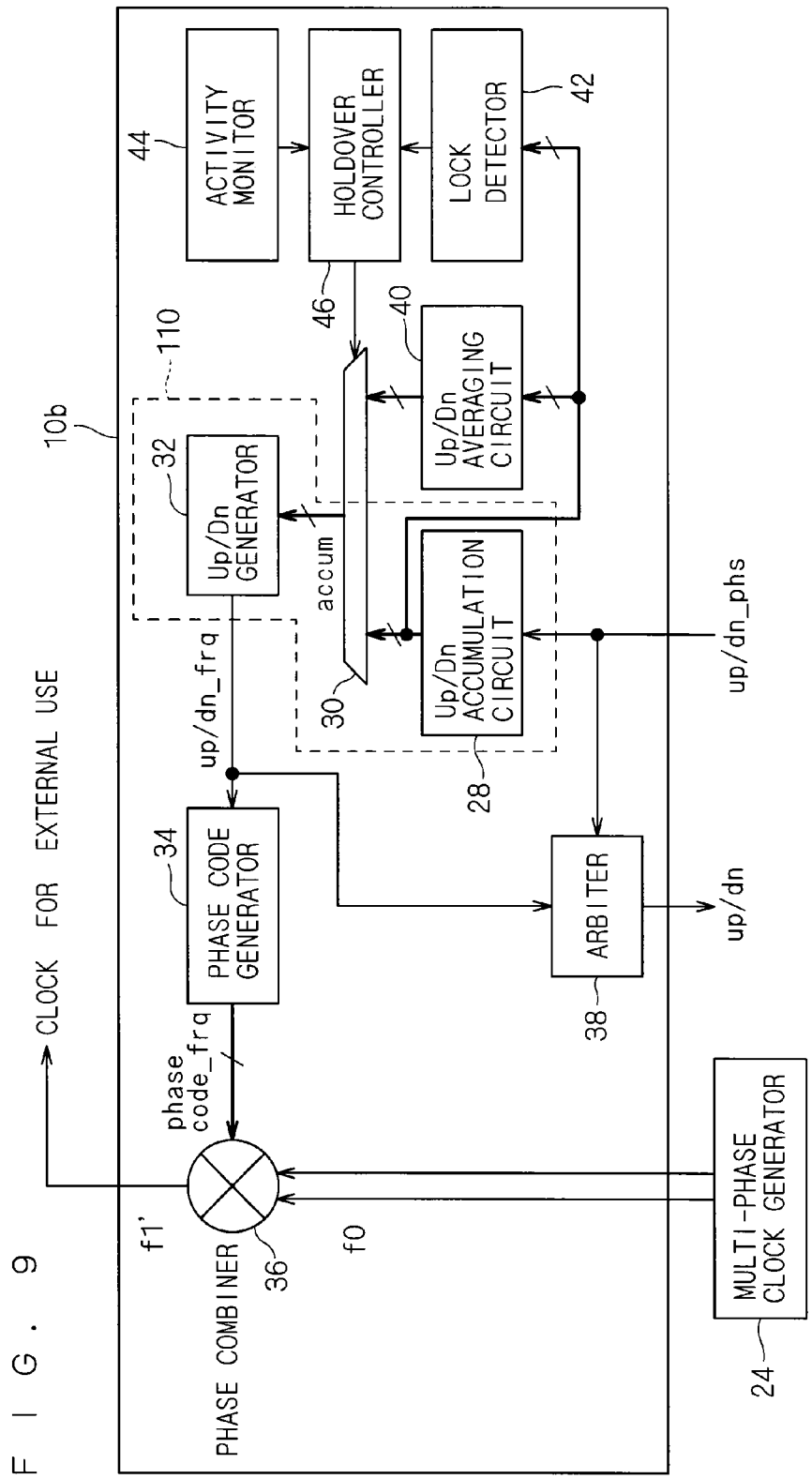
FIG. 9 is a block diagram illustrating a configuration of a synchronous clock generation unit according to the first preferred embodiment.

FIG. 8 is a block diagram illustrating a configuration of the clock/data reproduction unit 10a. FIG. 9 is a block diagram illustrating the synchronous clock generation unit 10b. As illustrated in FIG. 8, the clock/data reproduction unit 10a includes the same configuration as the above-described comparison target reception device 82. The clock/data reproduction unit 10a includes the input buffer 12, the sampler 14, the deserializer 16, the phase detector 18, the Up/Dn determination circuit 20, the phase code generator 22, the multi-phase clock generator 24, and the phase combiner 26 described above.

As illustrated in FIG. 9, the synchronous clock generation unit 10b includes an Up/Dn accumulation circuit 28, a multiplexer 30, an Up/Dn generator 32, a phase code generator 34, a phase combiner 36, an arbiter 38, an Up/Dn averaging circuit 40, a lock detector 42, an activity monitor 44, and a holdover controller 46.

In this preferred embodiment, the multi-phase clock generator 24 functions as a local clock source which generates a multi-phase local clock signal having a fixed frequency. Hereinafter, the multi-phase clock generator 24 may be referred to as a "local clock source 24." In addition, the sampler 14, the deserializer 16, the phase detector 18, the Up/Dn determination circuit 20, the phase code generator 22, and the phase combiner 26 constitute a first generation unit 100 which generates a reception clock signal from a multi-phase local clock signal generated by the local clock source 24.

In the first generation unit 100, the phase code generator 22 functions as a phase setting circuit that generates a phase code signal which is a phase setting signal. Hereinafter, the phase code generator 22 may be referred to as a "phase setting circuit 22."

The phase combiner 26 functions as a reception clock signal generator which generates a reception clock signal of a phase set by a phase setting signal (phase code signal) generated by the phase setting circuit 22 from a multi-phase local clock signal.

The sampler 14, the deserializer 16, the phase detector 18, and the Up/Dn determination circuit 20 constitute a timing signal generation circuit 101 that generates an up/dn_phs signal which is a timing signal indicating a direction in which a phase of the reception clock signal should be changed based on a result obtained by comparing a timing of an edge of the reception data signal to a timing of an edge of the reception clock signal.

Because the input buffer 12, the sampler 14, the deserializer 16, the phase detector 18, the Up/Dn determination circuit 20, the phase code generator 22, the multi-phase clock generator 24, and the phase combiner 26 have been described in the operation description of the above-described comparison target reception device 82, detailed description thereof is omitted here.

The Up/Dn determination circuit 20 outputs the up/dn_phs signal by performing the same filtering process as the Up/Dn determination circuit 20 of the comparison target reception device 82. As illustrated in FIG. 9, the up/dn_phs signal is supplied to the Up/Dn accumulation circuit 28 and the arbiter 38 of the synchronous clock generation unit 10b. In addition, an up/dn signal corresponding to the up/dn signal in the comparison target reception device 82 is output from the arbiter 38. The up/dn signal is supplied to the phase code generator 22 of the clock/data reproduction unit 10a as illustrated in FIG. 8.

As will be described later, the reception device 10 separates only a frequency component from an up/dn_phs signal including both the frequency component and a phase fluctuation component (phase fluctuation), and generates an up/dn_frq signal including the frequency component. Accordingly, the reception device 10 generates a clock signal for external use, using only the separated frequency component included in the up/dn_frq signal.

Here, the frequency component is a component representing a frequency offset between the local clock signal and the reception data signal. In other words, the frequency component is a component for compensating for a frequency offset between a frequency f0 of the local clock signal and a frequency f1 of the reception data signal. Hereinafter, the frequency component may be referred to as a "frequency offset component." The phase fluctuation component is a component representing phase fluctuation (jitter/wander) of the reception data signal. In other words, the phase fluctuation component is a component for causing the sampling clock signal to follow up the phase fluctuation (jitter/wander) included in the reception data signal. Also, after the separation of the frequency component is ended, the up/dn_phs signal includes only the phase fluctuation component.

The Up/Dn accumulation circuit 28 holds a cumulative value obtained by accumulating a difference between the number of up_phs signals and the number of dn_phs signals. The Up/Dn accumulation circuit 28 sets the cumulative value to +1 once the up_phs signal is received, and sets the cumulative value to −1 once the dn_phs signal is received. The Up/Dn accumulation circuit 28 removes a phase fluctuation component included in the up/dn_phs signal by performing accumulation. The cumulative value corresponds to a frequency offset between the local clock signal and the reception data signal. That is, the cumulative value converges into a fixed value including a frequency component (frequency offset component) mostly excluding a phase difference component. The Up/Dn accumulation circuit 28 constitutes an accumulation circuit which holds a cumulative value obtained by accumulating a timing signal generated by the timing signal generation circuit 101. The cumulative value is supplied as an accum signal to the Up/Dn generator 32 via the multiplexer 30, and supplied to the Up/Dn averaging circuit 40 and the lock detector 42.

Figure 10:
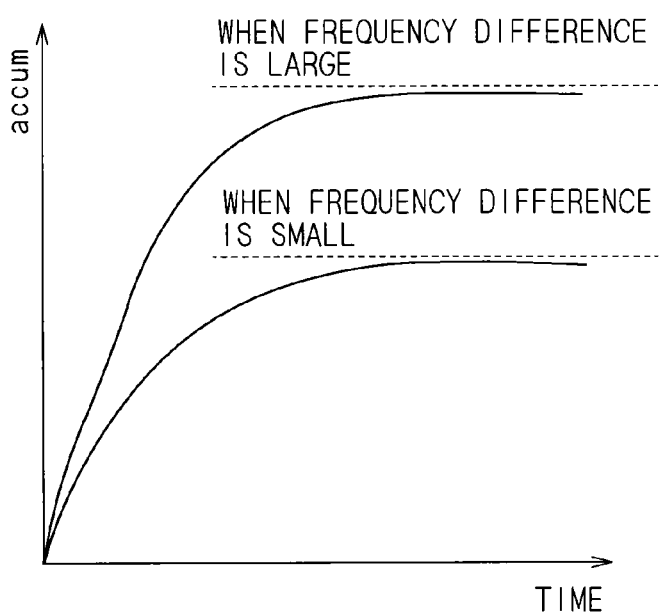
FIG. 10 is a graph illustrating a relationship between an accum_val signal and a time.

FIG. 10 is a graph illustrating a relationship between the accum signal and the time. In this graph, the vertical axis represents a value of the accum signal and the horizontal axis represents a time. As indicated by the solid line in the graph, the value of the accum signal increases with the passage of time. As indicated by the dashed line, the value of the accum signal converges on a fixed value. A value after the convergence corresponds to the frequency offset between the local clock signal and the reception data signal. More specifically, the value of the accum signal after the convergence is proportional to a value of the frequency offset.

The up/dn_phs signal includes both the frequency component and the phase fluctuation component corresponding to jitter/wander or the like included in the reception data signal before the cumulative value of the Up/Dn accumulation circuit 28 converges. After the cumulative value is converged, the up/dn_phs signal becomes a timing signal substantially including only a phase fluctuation component. In this state, in the up/dn_phs signal, the cumulative value of the difference between the number of up_phs signals and the number of dn_phs signals substantially becomes 0. That is, in the up/dn_phs signal, an appearance rate (frequency) of the up_phs signal is substantially equal to an appearance rate (frequency) of the dn_phs signal.

Subsequently, the Up/Dn generator 32 cumulatively adds the accum signal supplied from the Up/Dn accumulation circuit 28 via the multiplexer 30 for every predetermined fixed time, and generates an up/dn_frq signal (timing signal) every time a cumulative addition value exceeds a threshold value. The up/dn_frq signal is supplied to the phase code generator 34 and the arbiter 38. The Up/Dn generator 32 constitutes a timing signal generation circuit which generates a timing signal (up/dn_frq signal) indicating a direction in which the phase of the reception clock signal should be changed according to the cumulative value. Thereafter, the Up/Dn generator 32 may be referred to as a "timing signal generation circuit 32." The Up/Dn generator 32 further removes a phase fluctuation component included in an up/dn_frq signal by cumulatively adding the accum signal.

Subsequently, the arbiter 38 generates an up/dn signal by summing the up/dn_phs signal supplied from the Up/Dn determination circuit 20 and the up/dn_frq signal supplied from the Up/Dn generator 32. In principle, the arbiter 38 outputs an up signal when the up_phs signal is supplied, outputs a dn signal when the dn_phs signal is supplied, outputs the up signal when the up_frq signal is supplied, and outputs the dn signal when the dn_frq signal is supplied. However, when the up_phs signal and the up_frq signal are simultaneously supplied, the arbiter 38, for example, generates a continuous up signal. In addition, when the dn_phs signal and the dn_frq signal are simultaneously supplied, the arbiter 38, for example, generates a continuous dn signal. In addition, when the up_phs signal and the dn_frq signal are simultaneously supplied and when the dn_phs signal and the up_frq signal are simultaneously supplied, the arbiter 38, for example, generates neither the up signal nor the dn signal. The up/dn signal is supplied to the phase code generator 22. That is, the phase code generator 22 updates the phase code signal according to both the up/dn_phs signal and the up/dn_frq signal.

As described above, in this preferred embodiment, the Up/Dn accumulation circuit 28 and the Up/Dn generator 32 constitutes a second generation unit 110 which generates the up/dn_frq signal including the frequency offset component by removing the phase fluctuation component from the up/dn_phs signal including the frequency offset component and the phase fluctuation component.

When an input of the reception data signal to the reception device 10 of this preferred embodiment is initiated, the generation of the up/dn_phs signal by the Up/Dn determination circuit 20 is initiated. However, until the accumulation of the Up/Dn accumulation circuit 28 progresses, the generation of the up/dn_frq signal by the Up/Dn generator 32 is not performed. In this stage, the phase code generator 22 generates a phase code based on only the up/dn_phs signal. It is necessary for the up/dn_phs signal to include both a frequency component and a phase fluctuation component so that a phase of a sampling clock signal set by the phase code maintains a predetermined relationship for a phase of a reception data signal. That is, in this stage, the up/dn_phs signal of this preferred embodiment corresponds to an up/dn signal generated by the up/dn determination circuit 20 of the comparison target reception device 82.

Here, the reception data signal has a frequency f1 on average and includes phase fluctuation (jitter/wander) within a range allowed by specifications. Because the sampling clock signal generated by the comparison target reception device 82 includes phase fluctuation corresponding to that of the reception data signal, it does not satisfy a transfer specification of jitter/wander required for a clock signal for external use. On the other hand, the reception device 10 of this preferred embodiment includes a second generation unit 110 formed by the Up/Dn accumulation circuit 28 and the Up/Dn generator 32, and the frequency component and the phase fluctuation component are separated by the second generation unit 110.

After an input start of the reception data signal to the reception device 10 of this preferred embodiment, the accumulation of the up/dn_phs signal in the Up/Dn accumulation circuit 28 progresses with the passage of time. Thereby, the generation of the up/dn_frq signal by the Up/Dn generator 32 is initiated. As described above, the phase fluctuation component included in the up/dn_phs signal is removed by the accumulation of the up/dn_phs signal in the Up/Dn accumulation circuit 28 and the cumulative addition of the accum signal by the Up/Dn generator 32. Thus, only the frequency component is substantially included in the up/dn_frq signal. Accordingly, because the phase code generator 22 updates the phase_code signal based on the up/dn_frq signal including the frequency component, the frequency f1 of the reception data signal is close to the frequency f1' of the sampling clock signal and the frequency component included in the up/dn_phs signal is reduced.

Further, when the accumulation of the up/dn_phs signal in the Up/Dn accumulation circuit 28 progresses, a state in which a frequency offset between the frequency f0 of the local clock signal and the frequency f1 of the reception data signal can be compensated for using only the up/dn_frq signal generated by the Up/Dn generator 32 is reached. In this state, because the frequency f1' of the sampling clock signal is substantially consistent with the frequency f1 of the reception data signal, the phase detector 18 generates only the up/dn signal necessary to compensate for the phase fluctuation of the reception data signal. Accordingly, the up/dn_phs signal generated by the Up/Dn determination circuit 20 includes only information indicating the phase fluctuation. If accumulation is performed over a sufficiently long period, the phase fluctuation of the reception data signal becomes 0. Thus, variation in a cumulative value of the up/dn_phs signal (a cumulative value of a difference between a count of up_phs and a count of dn_phs) becomes 0. Consequently, as illustrated in FIG. 10, the accum signal is maintained in a state in which the accum signal is converged on a fixed value.

This convergent value corresponds to a frequency offset between the frequency f0 of the local clock signal and the frequency f1 of the reception data signal. As described above, when the input of the reception data signal is initiated, the frequency component and the phase fluctuation component mixed and included in the up/dn_phs signal are separated through an operation of the reception device 10, and the up/dn_frq signal including only the frequency component and the up/dn_phs signal including only the phase fluctuation component are generated. The arbiter 38 sums the up/dn_frq signal and the up/dn_phs signal, and generates an up/dn signal corresponding to the up/dn signal output from the Up/Dn determination circuit 20 of the comparison target reception device 82. The reception device 10 of this preferred embodiment generates a sampling clock signal similar to that of the comparison target reception device 82 using the up/dn signal.

In addition, the reception device 10 of this preferred embodiment generates a clock signal for external use, using the up/dn_frq signal substantially including only the frequency component. The phase code generator 34 generates a phase code_frq signal which is a phase code (phase setting signal) variable in a predetermined step in a direction determined by the up/dn_frq signal in order to solve a phase shift due to a frequency offset between the frequency f1 of the reception data signal and the frequency f0 of the local clock signal. That is, the phase code generator 34 updates the phase code_frq signal according to only the up/dn_frq signal. The phase code generator 34 constitutes a phase setting circuit which generates a phase setting signal (phase code_frq signal). The phase code_frq signal is supplied to the phase combiner 36. Hereinafter, the phase code generator 34 may be referred to as a "phase setting circuit 34."

The phase combiner 36 generates a clock signal for external use having a phase set by the phase code_frq signal from a multi-phase local clock signal supplied from the multi-phase clock generator 24. The phase combiner 36 constitutes a synchronous clock signal generator which generates the clock signal for external use having a phase set by the phase setting signal generated by the phase setting circuit 34 from the multi-phase local clock signal. By updating the phase code_frq signal at a rate (frequency) corresponding to the frequency offset between the frequency f1 of the reception data signal and the frequency f0 of the local clock signal, the frequency f1' of the clock signal for external use is substantially consistent with the frequency f1 of the reception data signal.

The comparison target reception device 82 generates a reception clock signal based on the up/dn signal including both the frequency component and the phase fluctuation component. On the other hand, the reception device 10 generates the up/dn_frq signal by separating only the frequency component from the up/dn_phs signal supplied from the Up/Dn determination circuit 20, and generates a clock signal external use based on only the up/dn_frq signal. Thereby, the reception device 10 can generate a synchronous clock signal (clock signal for external use), which has higher frequency stability than the reception clock signal and is consistent with a requirement specification, by making a slight change to the comparison target reception device 82 and adding a component unique to the reception device 10 of this preferred embodiment.

The Up/Dn averaging circuit 40 receives a cumulative value supplied from the Up/Dn accumulation circuit 28 for every predetermined time, and calculates and stores an average value of a predetermined number of cumulative values. The Up/Dn averaging circuit 40 functions as a storage circuit which stores a cumulative value (an average value of cumulative values in further detail) held by the Up/Dn accumulation circuit 28. During the holdover operation, the average value of the cumulative values is supplied to the Up/Dn generator 32, instead of supplying the cumulative value from the Up/Dn accumulation circuit 28 to the Up/Dn generator 32.

The lock detector 42 monitors the cumulative value supplied from the Up/Dn accumulation circuit 28 for every predetermined fixed time, determines that the reception data signal is stopped when a difference between a previous cumulative value and a current cumulative value (a change rate of a cumulative value) exceeds a threshold value, and generates a first invalid data flag indicating that the reception data signal is invalid data.

While the reception data signal having a fixed frequency is input, the cumulative value of the Up/Dn accumulation circuit 28 converges on a fixed value and does not greatly fluctuate from the convergent value. Therefore, when the cumulative value is greatly fluctuated, this means that any defect has occurred in the reception data signal. The lock detector 42 determines that the reception data signal is abnormal when the change rate of the cumulative value has exceeded a predetermined threshold value.

The activity monitor 44, for example, senses that the reception data signal is stopped by the following two means. That is, (1) when it is detected that a state transition rate (frequency) of the reception data signal is less than a predetermined threshold value and (2) when the number of phase fluctuation components included in the reception data signal is large and a rate (frequency) at which an invalid signal is generated within a predetermined fixed time exceeds a predetermined threshold value, the activity monitor 44 determines that the reception data signal is stopped. When it is determined that the reception data signal is stopped, the activity monitor 44 generates a second invalid data flag indicating that the reception data signal is invalid data.

The invalid signal is a signal generated by the phase detector 18 when a relationship between a timing of an edge of a reception data signal and a timing of an edge of a reception clock signal is in an invalid data area (invalid range) as will be described later.

Although it is desirable to include both the lock detector 42 and the activity monitor 44, it is only necessary to include at least one thereof.

When it is determined that the reception data signal is normal based on first and second invalid data flags, the holdover controller 46 controls the multiplexer 30 so that the multiplexer 30 outputs the cumulative value of the Up/Dn accumulation circuit 28 as the accum signal and supplies the output cumulative value to the Up/Dn generator 32. On the other hand, when it is determined that the reception data signal is abnormal based on the first and second invalid data flags, the holdover controller 46 controls the multiplexer 30 so that the multiplexer 30 outputs an average value of cumulative values of the Up/Dn averaging circuit 40 as the accum signal and supplies the output average value to the Up/Dn generator 32.

During the holdover operation, the Up/Dn generator 32 generates the up/dn_frq signal based on the accum signal (the average value of the cumulative values) supplied from the Up/Dn averaging circuit 40. Thereby, even when any defect occurs in the reception data signal, the reception device 10 can generate a clock signal for external use having a fixed frequency based on the average value of the cumulative values acquired when the reception data signal is normal.

The above-described Up/Dn averaging circuit 40, the lock detector 42, the activity monitor 44, and the holdover controller 46 constitute a data signal stop determination unit. When it is determined that the reception data signal has been stopped, in other words, when it is determined that normal reception data is not received in the reception device 10, the data signal stop determination unit supplies a cumulative value stored by the Up/Dn averaging circuit, which functions as a storage circuit, to the Up/Dn generator 32, instead of supplying the cumulative value from the Up/Dn accumulation circuit 28 to the Up/Dn generator 32.

<Details of Up/Dn Generator 32>

Figure 11:
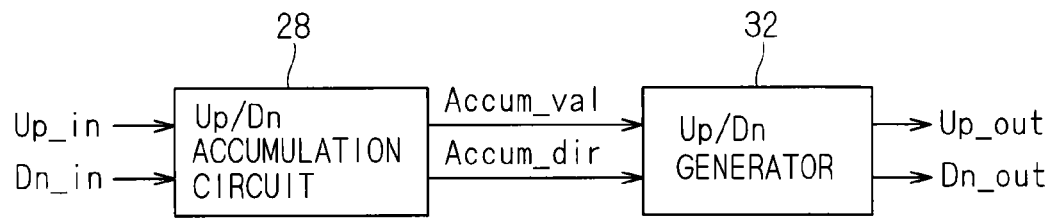
FIG. 11 is a conceptual diagram illustrating an Up/Dn accumulation circuit and an Up/Dn generator.

Next, the Up/Dn generator 32 will be described. FIG. 11 is a conceptual diagram illustrating the Up/Dn accumulation circuit 28 and the Up/Dn generator 32. An Up_in signal and a Dn_in signal input to the Up/Dn accumulation circuit 28 represent an up_phs signal and a dn_phs signal output from the Up/Dn determination circuit 20, respectively. An Accum_val signal output from the Up/Dn accumulation circuit 28 is a signal representing a part excluding a sign of the accum signal, and an Accum_dir signal is a signal representing a sign of the Accum_val signal. An Up_out signal and a Dn_out signal output from the Up/Dn generator 32 represent an up_frq signal and a dn_frq signal, respectively.

Figure 12:
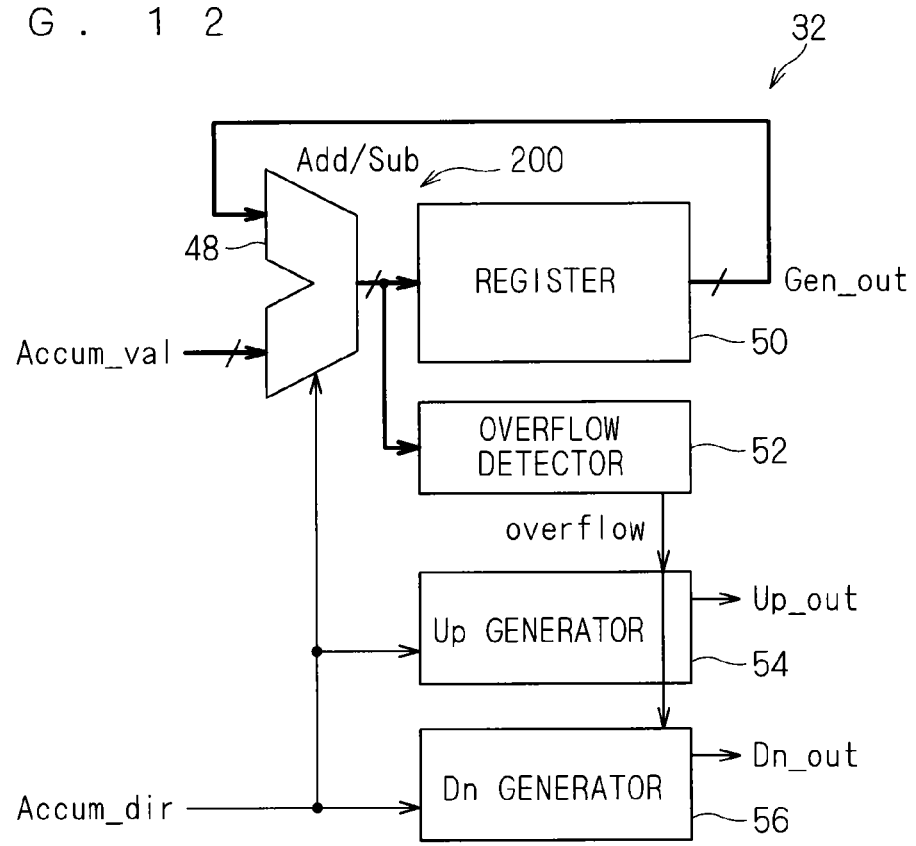
FIG. 12 is a block diagram illustrating a configuration of the Up/Dn generator.

FIG. 12 is a block diagram illustrating a configuration of the Up/Dn generator 32. The Up/Dn generator 32 illustrated in FIG. 12 includes an adder 48, a register 50, an overflow detector 52, an Up generator 54, and a Dn generator 56.

In the Up/Dn generator 32, a cumulative adder 200 including an adder 48 and a register 50 receives the Accum_val signal, which is a cumulative value, at a predetermined time interval from the Up/Dn accumulation circuit 28. According to the Accum_dir signal, the adder 48 performs addition or subtraction (Add/Sub) on a value of the Accum_val signal and a value of a Gen_out signal output from the register 50, and iteratively holds an addition or subtraction result in the register 50. The Gen_out signal, which is a cumulative addition value, is output from the register 50.

Here, for example, a value of the Accum_dir signal becomes 1 when the accum signal is a positive value, and for example, the value of the Accum_dir signal becomes 0 when the accum signal is a negative value.

When the value of the Accum_dir signal is 1, the cumulative adder 200 cumulatively adds the value of the Accum_val signal. Thereafter, when the value of the Accum_dir signal is transitioned to 0, the cumulative adder 200 cumulatively subtracts the value of the Accum_val signal from the Gen_Out signal. Accordingly, when the Gen_out signal has a negative value, the cumulative adder 200 cumulatively adds the value of the Accum_val signal after recognition of the negative value as a positive value.

When an output signal of the adder 48 is greater than or equal to a preset maximum value of a cumulative addition value, the overflow detector 52 outputs an overflow signal indicating that the cumulative adder 200 is overflowed. If the overflow signal is output, an Up_out signal is output from the Up generator 54 when the Accum_dir signal is 1, and a Dn_out signal is output from the Dn generator 56 when the Accum_dir signal is 0.

In addition, in the cumulative adder 200, the maximum value of the cumulative addition value is subtracted from a value of the Gen_Out signal, which is a cumulative addition value, every time the output signal of the adder 48 is greater than or equal to the maximum value of the cumulative addition value.

When the value of the Accum_val signal is small, a long time is necessary until the overflow signal is output. Thus, as illustrated in FIG. 13A, a cycle in which the Up/Dn_out signal is output is lengthened. As a result, a speed at which a phase of the clock signal for external use is varied becomes slow.

On the other hand, when the value of the Accum_val signal is large, the overflow signal is output in a short time. Thus, as illustrated in FIG. 13B, the cycle in which the Up/Dn_out signal is output is shortened. As a result, the speed at which the phase of the clock signal for external use is varied becomes fast.

Here, the value of the Accum_val signal is a value of the accum signal obtained by accumulating the up/dn_phs signal which is a timing signal (which may hereinafter be referred to as a "first timing signal") output from the Up/Dn determination circuit 20. In addition, the Up/Dn_out signal is an up/dn_frq signal which is a timing signal (which may hereinafter be referred to as a "second timing signal") output from the Up/Dn generator 32. Therefore, the Up/Dn generator 32 generates the second timing signal so that the phase of the clock signal for external use is varied at a speed according to a value obtained by accumulating the first timing signal. More specifically, the Up/Dn generator 32 generates the second timing signal so that the phase of the clock signal for external use is varied at a speed proportional to the value obtained by accumulating the first timing signal.

Here, further, as described above, the value of the accum signal is saturated to a value indicating a frequency offset between the local clock signal and the reception data signal, more specifically to a value proportional to the frequency offset. Therefore, after the value of the accum signal is saturated, the phase of the clock signal for external use is varied at a speed according to the frequency offset, more specifically, at a speed proportional to the frequency offset. Thereby, it is possible to compensate for the frequency offset using only the up/dn_frq signal including only a frequency component (a frequency offset component representing a frequency offset) for compensating for the frequency offset. Accordingly, it is possible to generate a clock signal for external use satisfying a necessary specification by updating the phase code_frq signal, which is a phase setting signal, according to only the up/dn_frq signal which is the second timing signal including only the frequency component.

On the other hand, in the above-described Japanese Patent Application Laid-Open No. 2003-283332, it is disclosed that "the offset control signal is output according to the cumulative number when the cumulative number of the phase control signal has exceeded the activation threshold value." It may be possible to associate the "cumulative number" with the value of the accum signal of this application and associate the "offset control signal" with the second timing signal of this application. However, in Japanese Patent Application Laid-Open No. 2003-283332, the generation of the clock signal for external use is not disclosed. In addition, in Japanese Patent Application Laid-Open No. 2003-283332, the offset control signal is output in a fixed cycle based on a counter when the cumulative number exceeds the activation threshold value. Under such circumstances, even when a clock signal of which the phase has been set by the phase setting signal updated according to only the offset control signal is generated, the phase of the clock signal is not varied at the speed according to the cumulative number. In addition, the offset control signal is not a signal including only the frequency component. Therefore, even when the clock signal obtained by setting the phase in the phase setting signal updated according to only the offset control signal is generated, the clock signal is not available as a clock signal for external use.

Circuits constituting a path of generation of the clock signal for external use, that is, the Up/Dn accumulation circuit 28, the Up/Dn generator 32, the timing signal generation circuit 101 (the sampler 14, the deserializer 16, the phase detector 18, and the Up/Dn determination circuit 20), and the phase code generator 34, constitute a low pass filter which prevents phase fluctuation included in the reception data signal from being transferred to the clock signal for external use. This characteristic needs to be appropriately set in order to enable the clock signal for external use satisfying a required specification to be generated. The cutoff frequency of the low pass filter, for example, is set to 1 Hz.

For example, when the Up/Dn generator 32 increases a time interval in which the Accum_val signal is received from the Up/Dn accumulation circuit 28, the cutoff frequency of the low pass filter is decreased. When the time interval is shortened, the cutoff frequency is increased. In addition, when the maximum value of the cumulative addition value of the Up/Dn generator 32 is increased, the cutoff frequency is decreased. When the maximum value is decreased, the cutoff frequency is increased.

<Regarding Details of Up/Dn Averaging Circuit>

Next, the Up/Dn averaging circuit 40 will be described. FIG. 14 is a conceptual diagram illustrating the Up/Dn averaging circuit 40. The Average_val signal output from the Up/Dn averaging circuit 40 illustrated in FIG. 14 is a signal representing an average value of the Accum_val signal, and the Average_dir signal is a signal representing a sign of the Average_val signal.

FIG. 15 is a block diagram illustrating a configuration of the Up/Dn averaging circuit 40. The Up/Dn averaging circuit 40 illustrated in FIG. 15 includes a plurality of cumulative adders 250 from #0 to #NMAX. Each cumulative adder 250 includes an adder 58 and a register 60. In FIG. 15, only one cumulative adder 250 is representatively illustrated by setting #N=0 to NMAX in order to avoid complexity of the drawing.

Each cumulative adder 250 of the Up/Dn averaging circuit 40 cumulatively adds values of a predetermined number of Accum_val signals according to the Accum_dir signal, and outputs an Average_val#N signal which is an average value of the values of the predetermined number of Accum_val signals. In the case of this preferred embodiment, the average value is obtained by a bit shift of a cumulative addition value. For example, an average value of values of 32 Accum_val signals can be obtained by performing a 5-bit shift on bits of the cumulative addition value to a less significant bit side.

In addition, the Average_dir signal representing a sign of the Average_val signal is output from each cumulative adder 250 according to the Accum_dir signal.

It is not indispensable for the Up/Dn averaging circuit 40 to include a plurality of cumulative adders 250. However, because a long time is necessary until values of a predetermined number of Accum_val signals are cumulatively added if there is only one cumulative adder 250, a problem may occur depending on an application.

On the other hand, as in this preferred embodiment, for example, when the cumulative adders 200 (registers #0 to #NMAX) of which the number is the same as the predetermined number are provided, the plurality of cumulative adders 200 can perform parallel processing by shifting a timing at which the cumulative addition of a value of an Accum_val signal is initiated one by one as illustrated in FIG. 16. Thereby, after an average value has been obtained from the cumulative adder 200 initially performing a predetermined number of cumulative addition operations, an average value can be obtained from the next one cumulative adder 200 every time one cumulative addition operation is performed. That is, every time a predetermined number of cumulative additions operations are performed, it is possible to sequentially obtain an average value for #N=0 to NMAX. Thereby, regardless of a timing at which the holdover has occurred, an average value calculated by performing cumulative addition until just before occurrence can be constantly supplied as the accum signal to the Up/Dn generator 32.

<Details of Activity Monitor>

Figure 17A:
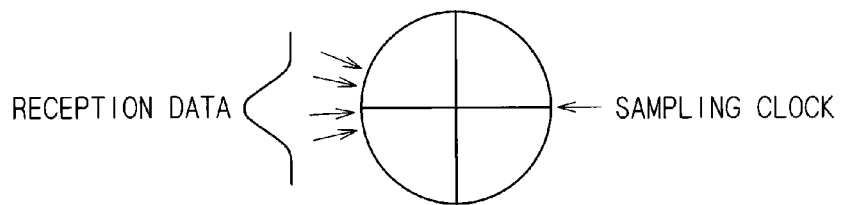
FIGS. 17A and 17B are conceptual diagrams each illustrating a relationship between a reception data signal an a sampling clock signal.
Figure 17B:
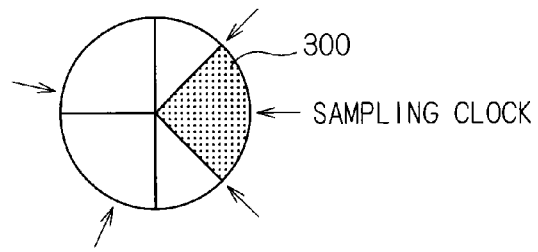

Next, the activity monitor 44 will be described. FIGS. 17A and 17B are conceptual diagrams illustrating a state in which the sampling clock signal is locked to the reception data signal and an unlocked state.

As described above, the clock/data reproduction unit 10*a* sets a phase of the sampling clock signal so that a rising edge of the sampling clock signal is positioned in the center between the transitions of the phase of the reception data signal. Thus, when the sampling clock signal (reception clock signal) is locked to the reception data signal, the phase of the reception data signal is at a position of a substantially 180-degree opposite side with respect to the phase of the sampling clock signal as illustrated in FIG. 17A. In the case of an example illustrated in FIG. 17A, the phase of the reception data signal is close to 180 degrees if the phase of the sampling clock signal is 0 degrees.

When the number of phase fluctuation components included in the reception data signal is large, the phase of the reception data signal may be separated from the vicinity of 180 degrees. Even in this case, a ratio at which the phase of the reception data signal is positioned in the vicinity of 180 degrees is high. However, when a state in which it is not possible to receive transmission data from the OLT normally due to a defect or the like of a communication line is reached, it is not possible to lock the sampling clock signal to the reception data signal. In this case, as illustrated in FIG. 17B, the phase of the reception data signal is distributed at random. As illustrated in FIG. 17B, the activity monitor 44 sets an invalid data area 300 in the vicinity of the phase of the sampling clock signal. In the case of FIG. 17B, a phase range of 45 degrees before and after the phase of the sampling clock signal is set as the invalid data area 300. The activity monitor 44 determines that the reception data signal has been stopped, that is, determines that a state in which it is not possible to normally receive transmission data from the OLT is reached when the rate (frequency) at which the phase of the reception data signal is included within the invalid data area 300 has exceeded a predetermined threshold value.

Actually, the reception data signal does not necessarily transition for every UI. The state of "1" or "0" may be continuous and the number of state transitions within a predetermined time may be reduced. Accordingly, when a rate (frequency) at which the phase of the reception data signal is positioned in the invalid data area 300 is calculated, a rate (frequency) of an "error" in which the phase of the transition is positioned in the invalid data area 300 during a predetermined number of transitions is calculated.

Figure 18:
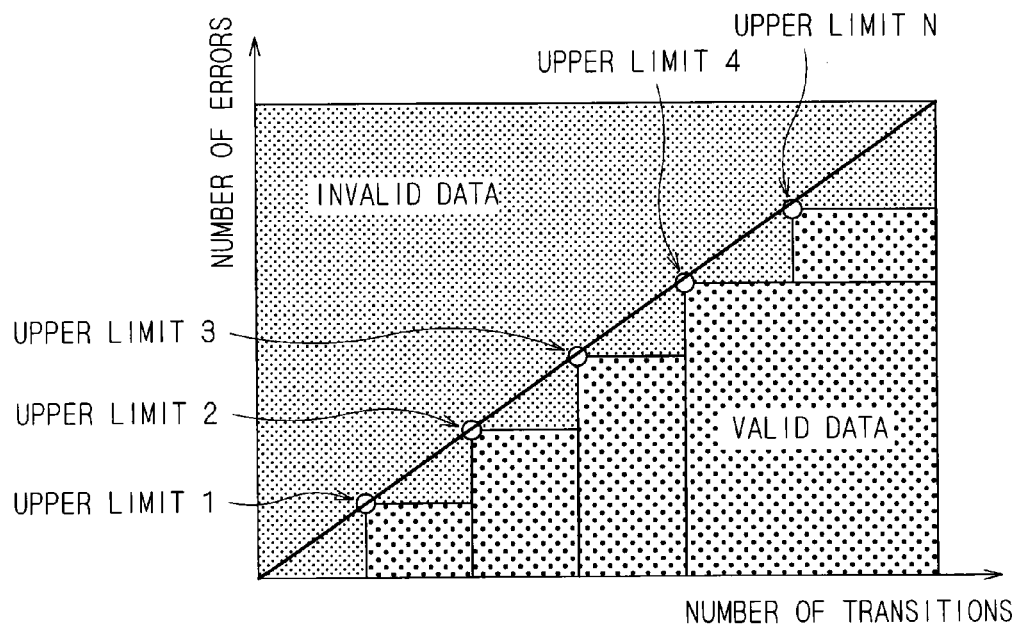
FIG. 18 is a graph illustrating a relationship between the number of reception data signals and the number of errors among the reception data signals.

FIG. 18 is a graph illustrating a relationship between the number of transitions of the reception data signal and the number of errors among the transitions. In FIG. 18, the vertical axis represents the number of errors and the horizontal axis represents the number of transitions of the reception data signal. The activity monitor 44 sets an upper limit (threshold value) of the number of error occurrences in which the phase of the reception data signal is included in the invalid data area 300 among a predetermined number of signal transitions. Accordingly, when the number of errors is larger than the upper limit, the activity monitor 44 determines that the reception data signal is invalid data.

For example, when the number of errors in 72 signal transitions is calculated, the activity monitor 44 sets an upper limit of the number of errors to 9. In this case, the activity monitor 44 monitors the number of errors for every 72 signal transitions, and determines that the reception data is invalid data when the number of errors is greater than or equal to 10.

Actually, a plurality of upper limits are set according to the number of transitions. For example, the upper limits of the number of error occurrences among 72 transitions, 36 transitions, 18 transitions, and the like are set to 9, 5, 3, and the like. A form in which all the upper limits are connected is a straight line from bottom left to top right in FIG. 18. The activity monitor 44 determines that the reception data signal of which the number of errors is included in an area above the straight line is invalid data. On the other hand, the activity monitor 44 determines that the reception data signal of which the number of errors is included in an area below the straight line is valid data.

The activity monitor 44 determines that the reception data signal is stopped when the reception data has been determined to be invalid data for a predetermined fixed time.

When a rate (frequency) of the state transition of the reception data signal is less than a predetermined threshold value, the activity monitor 44 determines that the reception data signal is stopped. For example, it is not likely that 72 continuous state transitions for the reception data signal are not performed in a certain application, the activity monitor 44 monitors the reception data signal for 72 UIs and determines that the reception data signal is stopped when there has been no state transition.

Also, the activity monitor 44 may determine that the reception data signal is stopped only upon detecting that the frequency of the state transition of the reception data signal is less than a predetermined threshold value. In addition, the activity monitor 44 may determine that the reception data signal is stopped only when the frequency of the phase of the reception data signal included within the invalid data area 300 exceeds a predetermined threshold value, that is, only when a frequency at which an invalid signal is generated by the phase detector 18 exceeds a predetermined threshold value.

As described above, in this preferred embodiment, a phase code_frq signal, which determines a phase of a clock signal for external use, is updated according to an up/dn_frq signal which includes a frequency component but has a small phase fluctuation component. Therefore, it is possible to prevent phase fluctuation of the reception data signal from affecting the frequency of the clock signal for external use. Consequently, it is possible to generate a clock signal for external use having high frequency stability.

Various Modified Examples of First Preferred Embodiment

First Modified Example

Although a clock signal output from the phase combiner 36 of the synchronous clock generation unit 10*b* is used as a clock signal for external use to be transmitted to the BTS, which is a downstream-side device in the above-described example, the clock signal may be used as another synchronous signal synchronized with the reception data signal. FIG. 19 is a diagram illustrating part of a configuration of the reception device 10 when a clock signal output from the phase combiner 36 is used as a transmission clock.

In the modified example of the reception device 10 illustrated in FIG. 19, a serializer 172 and an output buffer 174 are provided. The clock signal output from the phase combiner 36 is used as a transmission clock signal rather than the clock signal for external use. The serializer 172 converts a transmission data signal (parallel) supplied from a subscriber-side device of a portable telephone or the like into serial data and generates a transmission data signal (serial) to be transmitted to the OLT. The serializer 172 operates in synchronization with the transmission clock signal output from the phase combiner 36. The transmission data signal output from the serializer 172 is transmitted to the OLT via the output buffer 174.

In the modified example of the reception device 10 illustrated in FIG. 19, a phase code_frq signal, which determines the phase of the transmission clock signal, is updated according to an up/dn_frq signal which includes the frequency component but has the small phase fluctuation component. Therefore, it is possible to prevent the phase fluctuation of the reception data signal from affecting the frequency of the transmission clock signal. Consequently, it is possible to generate the transmission clock signal having high frequency stability.

Also, the reception device 10 according to this modified example may not include the Up/Dn averaging circuit 40, the lock detector 42, the holdover controller 46, the activity monitor 44, and the multiplexer 30. In this case, a cumulative value output from the Up/Dn accumulation circuit 28 is directly input to the Up/Dn generator 32.

Second Modified Example

FIG. 20 is a block diagram illustrating a configuration of a reception device 10A which is a modified example of the reception device 10. The reception device 10A includes a clock/data reproduction unit 10a and two synchronous clock generation units 10b.

One of the two synchronous clock generation units 10b generates a clock signal for external use as in the above-described synchronous clock generation unit 10b illustrated in FIG. 9. The other of the two synchronous clock generation units 10b generates a transmission clock signal as in the above-described synchronous clock generation unit 10b illustrated in FIG. 19. In the reception device 10A according to this modified example, an up/dn_phs signal output from the Up/Dn determination circuit 20 of the clock/data reproduction unit 10a is input to each of the Up/Dn accumulation circuits 28 of the two synchronous clock generation units 10b.

In addition, in the reception device 10A, the serializer 172 and the output buffer 174 described above are provided. Accordingly, the transmission clock signal generated by the other of the two synchronous clock generation units 10b is input to the serializer 172.

Thus, in the reception device 10A, both a clock signal for external use and a reception clock signal are generated by the two synchronous clock generation units 10b having the same configuration. Also, in the synchronous clock generation unit 10b which generates the transmission clock signal, the Up/Dn averaging circuit 40, the lock detector 42, the holdover controller 46, the activity monitor 44, and the multiplexer 30 may not be provided.

Second Preferred Embodiment

Next, a reception device 62 according to the second preferred embodiment will be described. The reception device 62 of this preferred embodiment constitutes an line terminating device which receives a reception data signal from an station-side terminating device. Like the reception device 10 of the first preferred embodiment, the reception device 62 of this preferred embodiment also generates a synchronous clock signal having high frequency stability from the reception data signal. Specifically, the reception device 62 of this preferred embodiment generates a transmission clock signal having high frequency stability from the reception data signal. The transmission clock signal is a clock signal which determines an operation timing of a circuit element that generates a transmission data signal to be transmitted to the OLT. The transmission clock signal is required to satisfy the above-described jitter transfer specification and has high frequency stability as compared to the reception clock signal.

Figure 21:
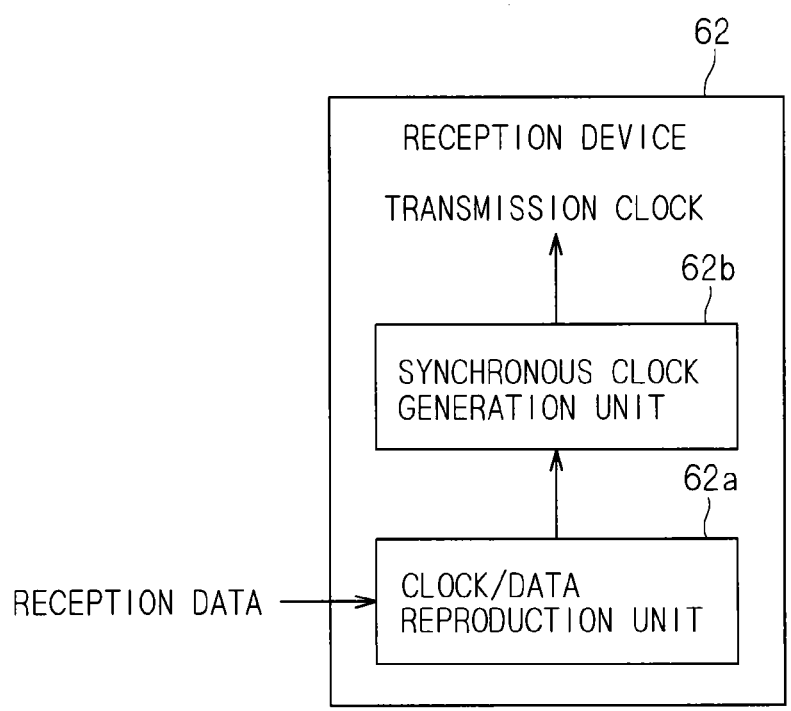
FIG. 21 is a block diagram illustrating a configuration of a reception device according to a second preferred embodiment.
Figure 22:
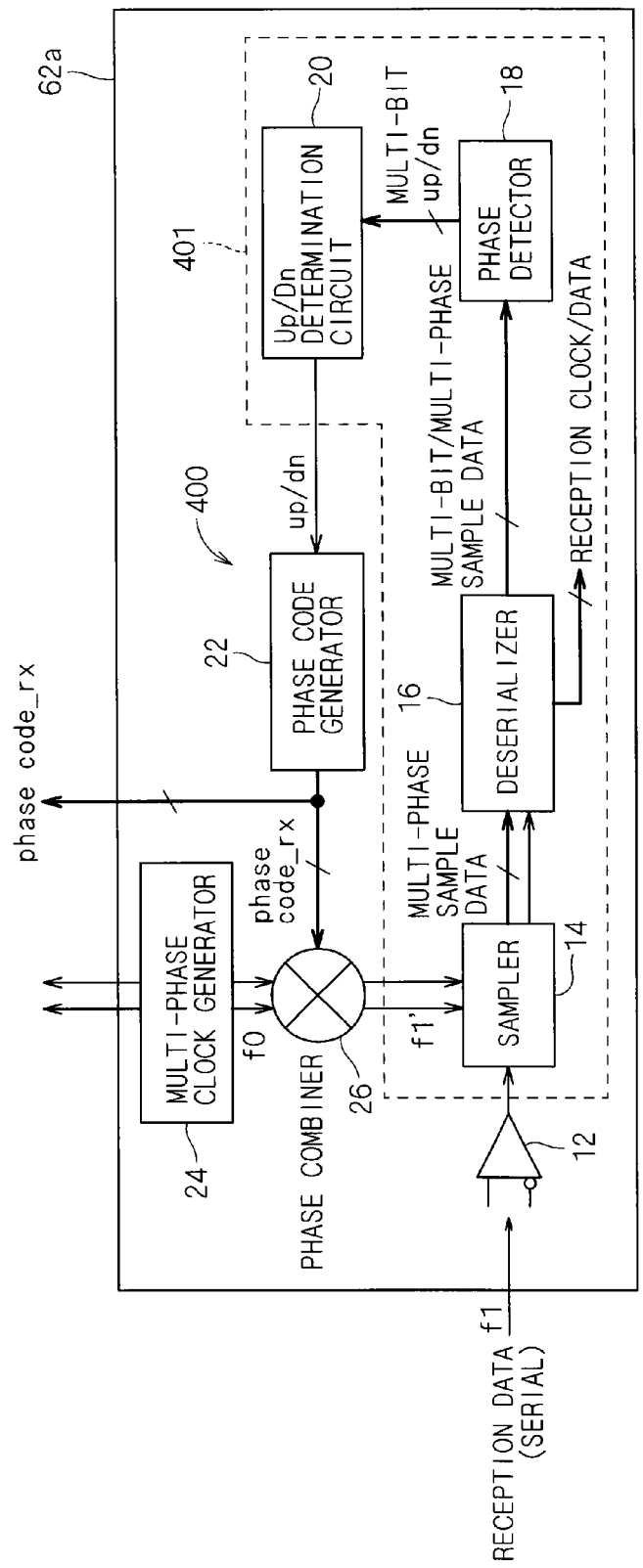
FIG. 22 is a block diagram illustrating a configuration of a clock/data reproduction unit according to the second preferred embodiment.
Figure 23:
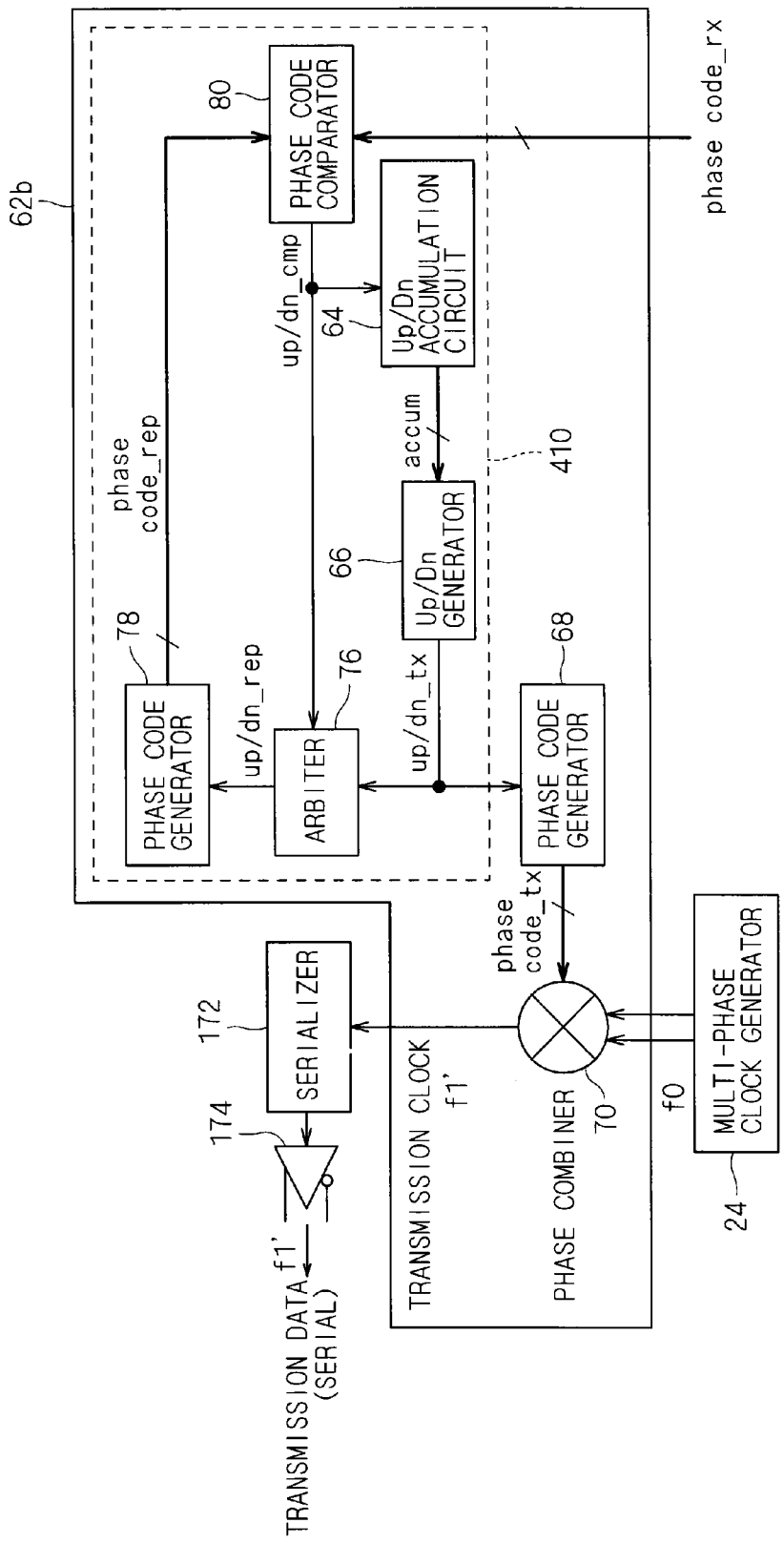
FIG. 23 is a block diagram illustrating a configuration of a synchronous clock generation unit according to the second preferred embodiment.

FIG. 21 is a block diagram illustrating a configuration of the reception device 62 according the second preferred embodiment. The reception device 62 includes a clock/data reproduction unit 62a and a synchronous clock generation unit 62b. FIG. 22 is a block diagram illustrating the clock/data reproduction unit 62a. FIG. 23 is a block diagram mainly illustrating the synchronous clock generation unit 62b.

As illustrated in FIG. 22, the clock/data reproduction unit 62a includes the same configuration as the above-described comparison target reception device 82. The clock/data reproduction unit 62a includes the input buffer 12, the sampler 14, the deserializer 16, the phase detector 18, the Up/Dn determination circuit 20, the phase code generator 22, the multi-phase clock generator 24, and the phase combiner 26 described above.

As illustrated in FIG. 23, the synchronous clock generation unit 62b includes an Up/Dn accumulation circuit 64, an Up/Dn generator 66, a phase code generator 68, a phase combiner 70, an arbiter 76, a phase code generator 78, and a phase code comparator 80.

In addition, a serializer 172 and an output buffer 174 are provided in the reception device 62 according to this preferred embodiment. The serializer 72 and the output buffer 74 constitute part of the transmission device in the ONU, and generate transmission data to be transmitted to the OLT using the transmission clock signal generated by the reception device 62.

In this preferred embodiment, as in the first preferred embodiment, the multi-phase clock generator 24 function as a local clock source which generates a multi-phase local clock signal having a fixed frequency. In addition, the sampler 14, the deserializer 16, the phase detector 18, the Up/Dn determination circuit 20, the phase code generator 22, and the phase combiner 26 constitute a first generation unit 400 which generates a reception clock signal from a multi-phase local clock signal generated by the local clock source 24.

In the first generation unit 400, as in the first preferred embodiment, the phase code generator 22 functions as a phase setting circuit that generates a phase code signal which is a phase setting signal. The phase combiner 26 functions as a reception clock signal generator which generates a reception clock signal of a phase set by a phase setting signal (phase code signal) generated by the phase setting circuit 22 from a multi-phase local clock signal. The sampler 14, the deserializer 16, the phase detector 18, and the Up/Dn determination circuit 20 constitute a timing signal generation circuit 401 that generates an up/dn signal which is a timing signal indicating a direction in which a phase of the reception clock signal should be changed based on a result obtained by comparing a timing of an edge of the reception data signal to a timing of an edge of the reception clock signal.

Because the input buffer 12, the sampler 14, the deserializer 16, the phase detector 18, the Up/Dn determination circuit 20, the phase code generator 22, the multi-phase clock generator 24, and the phase combiner 26 have been described above in the description of the operation of the comparison target reception device 82, detailed description thereof is omitted here.

In the reception device 62, the phase code generator 22 updates a phase code_rx signal according to the up/dn signal generated by the Up/Dn determination circuit 20.

In the reception device 62 according to this preferred embodiment, the phase code_rx signal which is a phase code of the reception clock signal output from the phase code generator 22 is supplied to the phase code comparator 80 of the synchronous clock generation unit 62b.

The synchronous clock generation unit 62b of the reception device 62 according to this preferred embodiment generates a transmission clock signal having frequency precision consistent with a requirement specification of the transmission clock signal from the phase code_rx signal including a frequency component and a phase difference component.

The phase code_rep signal generated by the synchronous clock generation unit 62b is a replica phase code signal obtained by copying the phase code_rx signal, and is varied by following up the phase code_rx signal. The phase code comparator 80 compares the phase code_rx signal to the phase code_rep signal, and generates an up/dn_cmp signal according to a comparison result. In the up/dn_cmp signal, as in the phase code_rx signal, the frequency component and the phase difference component are included. The phase code comparator 80 constitutes a comparison circuit which generates an up/dn_cmp (comparison timing signal) indicating a direction in which the phase code_rep signal should be updated based on a result obtained by comparing the phase code_rx signal to the phase code_rep signal.

The Up/Dn accumulation circuit 64, the Up/Dn generator 66, the phase code generator 68, and the phase combiner 70 correspond to the Up/Dn accumulation circuit 28, the Up/Dn generator 32, the phase code generator 34, and the phase combiner 36 of the reception device 10 according to the first preferred embodiment, respectively.

The Up/Dn accumulation circuit 64 holds a cumulative value obtained by accumulating a difference between the number of up_cmp signals and the number of dn_cmp signals. The Up/Dn accumulation circuit 64 sets the cumulative value to +1 once the up_cmp signal is received, and sets the cumulative value to −1 once the dn_cmp signal is received. The Up/Dn accumulation circuit 64 removes a phase fluctuation component included in the up/dn_cmp signal by performing accumulation. The cumulative value corresponds to a frequency offset between the local clock signal and the reception data signal. That is, the cumulative value converges on a fixed value including a frequency component (frequency offset component) mostly excluding a phase difference component. An accum signal, which is a cumulative value, is supplied to the Up/Dn generator 66.

The Up/Dn generator 66 includes a cumulative adder, and receives and cumulatively adds an accum signal (cumulative value) from the Up/Dn accumulation circuit 64 at a fixed time interval. Every time the cumulative addition value reaches a threshold value, the Up/Dn generator 66 subtracts its maximum value from the cumulative addition value, and generates an up/dn_tx signal. The Up/Dn generator 66 further removes a phase fluctuation component included in an up/dn_tx signal by performing cumulative addition on the accum signal. The up/dn_tx signal is supplied to the phase code generator 68 and the arbiter 76. The Up/Dn generator 66 constitutes a timing signal generation circuit which generates a timing signal (up/dn_tx signal) indicating a direction in which the phase code_rep signal, which is a phase setting signal output by the phase code generator 78, should be changed according to the cumulative value. Hereinafter, the Up/Dn generator 66 may be referred to as a "timing signal generation circuit 66."

The phase code generator 68 generates a phase code_tx signal which is a phase code that varies in a predetermined step in a direction determined by the up/dn_tx signal. That is, the phase code generator 68 updates the phase code_tx signal according to only the up/dn_tx signal which is a timing signal output from the timing signal generation circuit 66. The phase code_tx signal is supplied to the phase combiner 70.

The phase combiner 70 generates a transmission clock signal of a phase set by the phase code_tx signal from a multi-phase local clock signal supplied from the multi-phase clock generator 24. A frequency f1' of the transmission clock signal is a frequency which is substantially equal to a frequency f1 of the reception data signal.

The serializer 172 converts a transmission data signal (parallel) supplied from the subscriber-side device such as a portable telephone into serial data, and generates a transmission data signal (serial) to be transmitted to the OLT. The serializer 172 operates in synchronization with a transmission clock generated by the synchronous clock generation unit 62b. A transmission data signal from the serializer 172 is transmitted to the OLT via the output buffer 174.

Like the arbiter 38 of the reception device 10 according to the first preferred embodiment, the arbiter 76 generates an up/dn_rep signal by summing the up/dn_cmp signal supplied from the phase code comparator 80 and the up/dn_tx signal supplied from the Up/Dn generator 66. The up/dn_rep signal is supplied to the phase code generator 78.

The phase code generator 78 generates a phase code_rep signal which varies in a predetermined step in a direction determined by the up/dn_rep signal. That is, the phase code generator 78 updates the phase code_rep signal according to both the up/dn_cmp signal and the up/dn_tx signal. The phase code generator 78 constitutes a phase setting circuit which generates the phase code_rep signal updated by following up an update of the phase code_rx signal. The phase code_rep signal is supplied to the phase code comparator 80.

As described above, in this preferred embodiment, the Up/Dn accumulation circuit 64, the Up/Dn generator 66, the arbiter 76, the phase code generator 78, and the phase code comparator 80 constitute a second generation unit 410 which generates an up/dn_tx signal including a frequency component by removing a phase fluctuation component from the phase_code rx signal including the frequency component and the phase fluctuation component.

When an input of the phase code_rx signal to the phase code comparator 80 is initiated in the reception device 62 of this preferred embodiment, the generation of the up/dn_cmp is initiated. However, the generation of the up/dn_tx signal by the Up/Dn generator 66 is not performed until the accumulation in the Up/Dn accumulation circuit 64 progresses. In this stage, the phase code generator 78 generates the phase code_rep signal based on only the up/dn_cmp signal. It is necessary for the up/dn_cmp signal to include both the frequency component and the phase fluctuation component so that the phase code_rep signal follows up the phase code_rx signal.

Thereafter, with the passage of time, the accumulation of the up/dn_cmp signal in the Up/Dn accumulation circuit 84 progresses. Thereby, the generation of the up/dn_tx signal by the Up/Dn generator 66 is initiated. As in the first preferred embodiment, the phase fluctuation component included in the up/dn_cmp signal is removed through the accumulation of the up/dn_cmp signal in the UP/Dn accumulation circuit 64 and the cumulative addition of the accum signal by the Up/Dn generator 66. Thus, only the frequency component is substantially included in the up/dn_tx signal. Accordingly, according to an operation of the clock/data reproduction unit 62a, the frequency f1 of the reception data signal is close to the frequency f1' of the sampling clock signal, the frequency component included in the phase code_rx signal is reduced, and hence the frequency component included in the up/dn_rep signal is reduced.

Further, when a process of causing the frequency f1 of the reception data signal and the frequency f1' of the sampling clock signal to be consistent in the clock/data reproduction unit 62a progresses and the accumulation of the up/dn_cmp signal in the Up/Dn accumulation circuit 64 progresses, a state in which it is possible to compensate for a frequency offset between the frequency f0 of the local clock signal and the frequency f1' of the reception clock signal in only the up/dn_tx signal generated by the Up/Dn generator 66 is reached. That is, because the frequency f1' of the reception clock signal is substantially equal to the frequency f1 of the reception data signal, a state in which it is possible to compensate for a frequency offset between a frequency f0 of the local clock signal and the frequency f1 of the reception data signal in only the up/dn_tx signal generated by the Up/Dn generator 66 is reached. In this state, the phase code comparator 80 generates only the up/dn signal necessary to compensate for phase fluctuation of the reception data signal, and the up/dn signal includes only information of the phase fluctuation. The phase fluctuation of the reception data signal becomes 0 if accumulation is performed over a sufficiently long time. Thus, the variation of the cumulative value of the up/dn_cmp signal also becomes 0. Consequently, as in the first preferred embodiment, a state in which a value of the accum signal obtained by accumulating the up/dn_cmp signal is converged on a fixed value is maintained.

The convergent value corresponds to the frequency offset between the frequency f0 of the local clock signal and the frequency f1 of the reception data signal. More specifically, the convergent value is proportional to the frequency offset. The Up/Dn generator 66 generates the up/dn_tx signal so that the phase of the transmission clock signal is varied at a speed according to a value of a convergent accum signal, more specifically, at a speed proportional to a value of the convergent accum signal.

As described above, in the synchronous clock generation unit 62b of the reception device 62, the frequency component and the phase fluctuation component included in the phase code_rx signal are separated, and the up/dn_tx signal substantially including only the frequency component and the up/dn_cmp signal substantially including only the phase fluctuation component are generated.

In order to implement the reception device 10 according to the first preferred embodiment, it is necessary to change the configuration of the clock/data reproduction unit from the comparison target reception device 82. On the other hand, in order to implement the reception device 62 of this preferred embodiment, it is necessary to never change the configuration of the clock/data reproduction unit from the comparison target reception device 82. Thus, when the clock/data reproduction unit is already complemented in a stand-alone type and provided, there is a merit in that it is possible to generate a synchronous clock signal having high frequency stability as compared to the reception clock signal by merely adding a component unique to the reception device 62 of this preferred embodiment such as the synchronous clock generation unit 62b.

<Details of Phase Code Comparator>

Figure 24A:
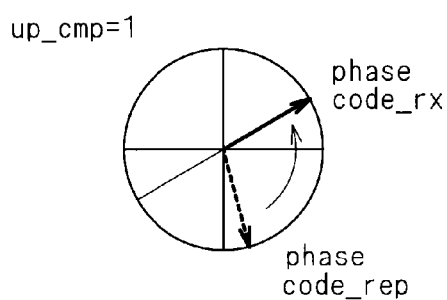
FIGS. 24A and 24B are conceptual diagrams illustrating definitions of an up_cmp signal and a dn_cmp signal output from a phase code comparator.
Figure 24B:
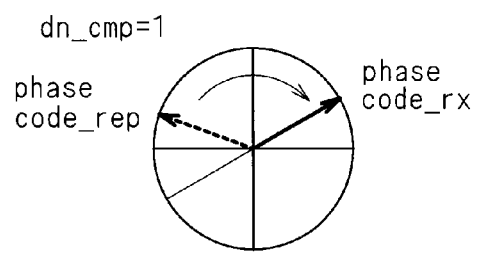

Next, the phase code comparator 80 will be described. FIGS. 24A and 24B are conceptual diagrams illustrating definitions of an up_cmp signal and a dn_cmp signal output from the phase code comparator 80.

A value of the phase code_rep signal is sequentially changed so that the phase set by the phase code_rep signal is varied by following up the phase set by the phase code_rx signal.

For example, in FIG. 24A, the phase set by the phase code_rep signal is later than the phase set by the phase code_rx signal, and a difference between the two phases is less than 180 degrees. In this case, it is necessary to change a value of the phase code_rep signal so that the phase set by the phase code_rep signal is varied in a direction in which the phase becomes early so as to follow up the phase set by the phase code_rx signal in the counterclockwise direction. Thus, the phase code comparator 80 outputs the up_cmp signal=1.

On the other hand, in FIG. 24B, the phase set by the phase code_rep signal is earlier than the phase set by the phase code_rx signal, and a difference between the two phases is less than 180 degrees. In this case, it is necessary to change a value of the phase code_rep signal so that the phase set by the phase code_rep signal is varied in a direction in which the phase becomes late so as to follow up the phase set by the phase code_rx signal in the clockwise direction. Thus, the phase code comparator 80 outputs the dn_cmp signal=1.

In addition, when the phase set by the phase code_rx signal is consistent with the phase set by the phase code_rep signal, it is not necessary to change a value of the phase code_rep signal. In this case, the phase code comparator 80 outputs the up_cmp signal=0 and the dn_cmp signal=0.

Also, the above description is an example of a definition of the up/dn_cmp signal, which can also be defined opposite to the above description.

Figure 25A:
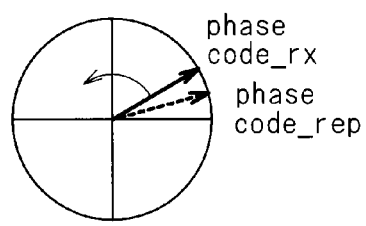
FIGS. 25A and 25B are conceptual diagrams each illustrating a direction in which a phase set by a phase code_rx signal moves.
Figure 25B:
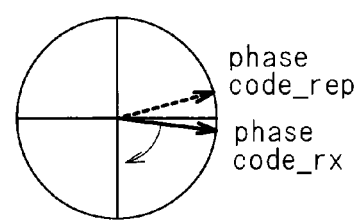

Subsequently, FIGS. 25A and 25B are conceptual diagrams each illustrating a direction in which the phase set by the phase code_rx signal moves. The phase set by the phase code_rx signal, that is, the phase of the reception clock signal, is varied to follow up the phase of the reception data signal. FIG. 25A corresponds to the case in which the phase set by the phase code_rx signal moves in the counterclockwise direction, and FIG. 25B corresponds to the case in which the phase moves in the clockwise direction. In either case, the phase set by the phase code_rep signal is varied to follow up the phase set by the phase code_rx signal.

Circuits constituting the path of generation of a transmission clock signal, that is, the timing signal generation circuit 401 (the sampler 14, the deserializer 16, the phase detector 18, and the Up/Dn determination circuit 20), the phase code generator 22, the phase code comparator 80, the Up/Dn accumulation circuit 64, the Up/Dn generator 66, and the phase code generator 68, constitute a low pass filter which prevents phase fluctuation included in the reception data signal from being transferred to the transmission clock signal. This characteristic needs to be appropriately set in order to enable the transmission clock signal satisfying a required specification to be generated. The cutoff frequency of the low pass filter, for example, is set to 1 MHz. Thereby, the timing signal generation circuit 401, the phase code generator 22, the phase code comparator 80, the Up/Dn accumulation circuit 64, the Up/Dn generator 66, and the phase code generator 68 have low pass filter characteristics, which prevent a component of 1 MHz or more from being transferred to the transmission clock signal, in phase fluctuation included in the reception data signal.

As in the first preferred embodiment, in order to decrease the cutoff frequency of the low pass filter, for example, the Up/Dn generator 66 increases a time interval in which the accum signal is received from the Up/Dn accumulation circuit 64. Alternatively, the maximum value of the cumulative addition value of the Up/Dn generator 66 is increased. In order to increase the cutoff frequency, the Up/Dn generator 66 shortens the time interval in which the accum signal is received from the Up/Dn accumulation circuit 64 or decreases the maximum value of the cumulative addition value of the Up/Dn generator 66.

The frequency offset component is included in this preferred embodiment as described above, but the phase code_tx signal, which determines the phase of the transmission clock signal, is updated according to the up/dn_tx signal having a small phase fluctuation component. Therefore, it is possible to prevent phase fluctuation of the reception data signal from affecting the frequency of the transmission clock signal. Consequently, it is possible to generate a transmission clock signal with high frequency stability.

Various Modified Examples of Second Preferred Embodiment

First Modified Example

FIG. 26 is a block diagram illustrating a configuration of a reception device 62A which is the modified example of the reception device 62. The reception device 62A includes a synchronous clock generation unit 62c instead of the synchronous clock generation unit 62b in the reception device 62 illustrated in FIG. 21.

Figure 27:
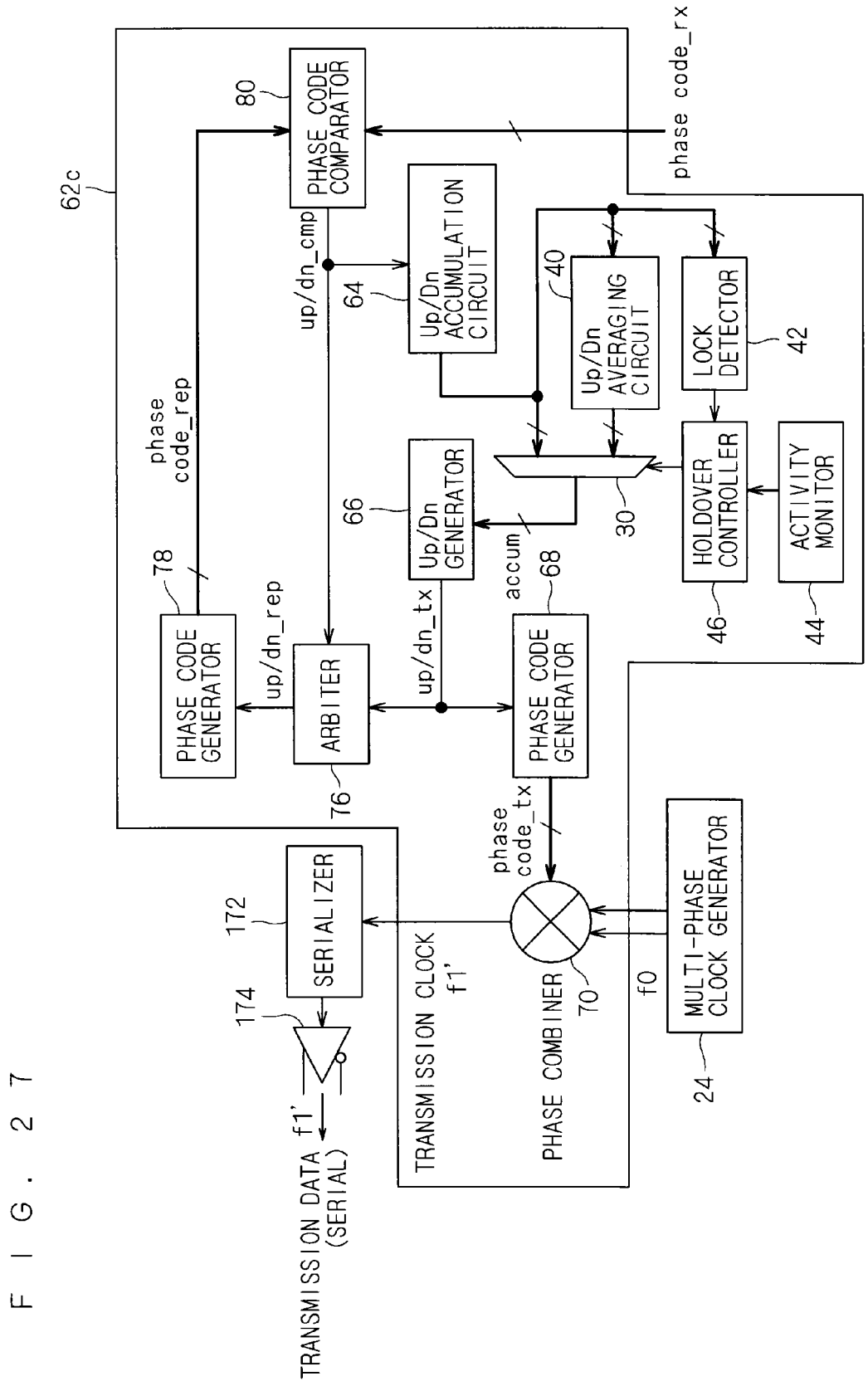
FIG. 27 is a block diagram illustrating a configuration of a modified example of the synchronous clock generation unit according to the second preferred embodiment.

FIG. 27 is a diagram illustrating a configuration of the synchronous clock generation unit 62c. The synchronous clock generation unit 62c is obtained by further providing the Up/Dn averaging circuit 40, the lock detector 42, the holdover controller 46, an activity monitor 44, and the multiplexer 30 in the synchronous clock generation unit 62b. In the synchronous clock generation unit 62c, a cumulative value generated by the Up/Dn accumulation circuit 64 is input to the multiplexer 30, and an output signal of the multiplexer 30 is input as an accum signal to the Up/Dn generator 66.

Even when any defect has occurred in a reception data signal, the reception device 62A having such a configuration can generate a transmission clock signal having a fixed frequency based on an average value of cumulative values acquired when the reception data signal has been normal.

Figure 28:
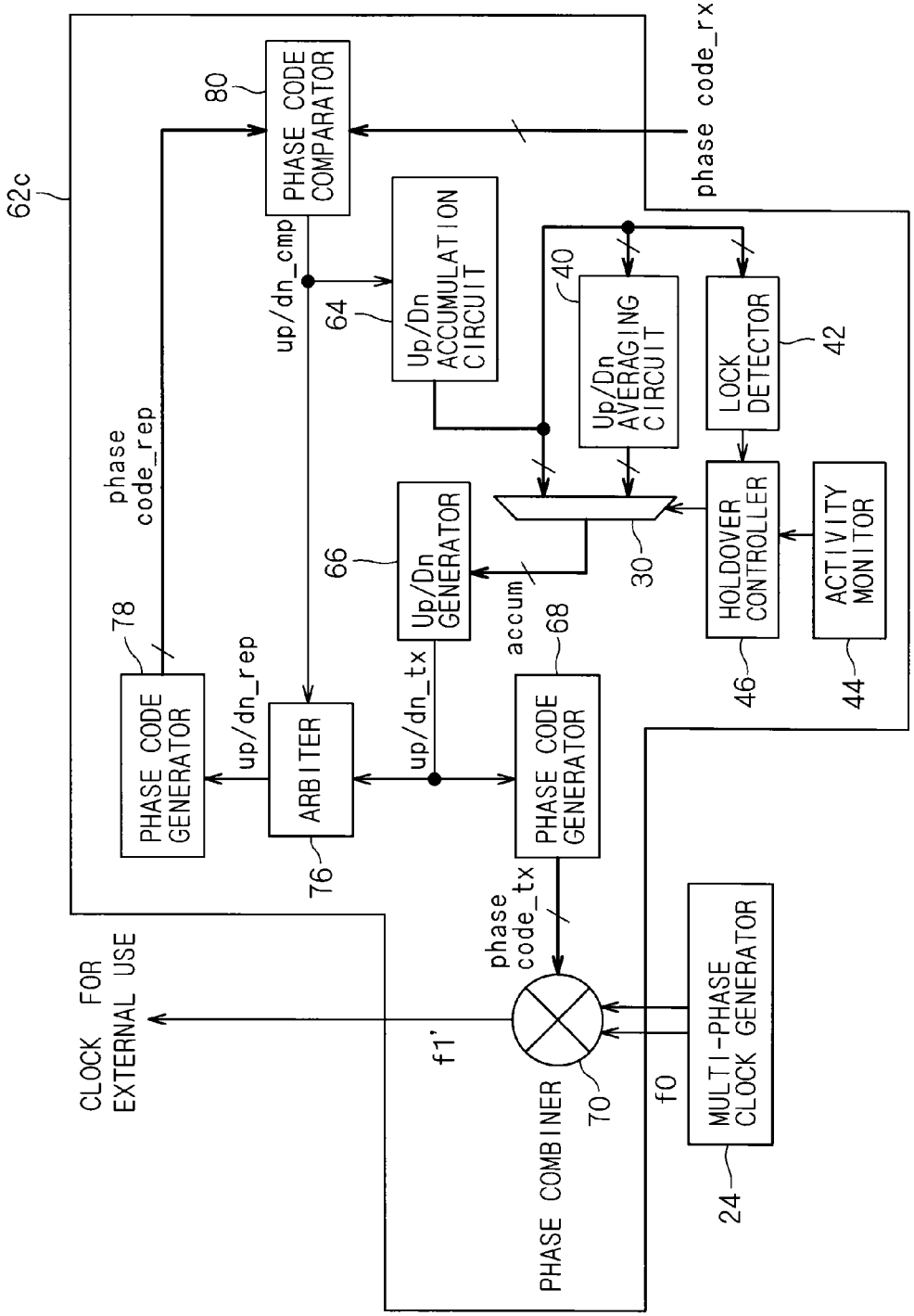
FIG. 28 is a block diagram illustrating a configuration of a modified example of the synchronous clock generation unit according to the second preferred embodiment.

Also, when Synchronous Ethernet (registered trademark) is used between the reception device 62A and the BTS, a clock signal output from the phase combiner 70 of the synchronous clock generation unit 62c may be used as a clock signal for external use to be transmitted to the BTS without using the output clock signal as a transmission clock signal as illustrated in FIG. 28. In this case, the cutoff frequency of the above-described low pass filter, for example, is set to 1 Hz. Thereby, in the reception device 62A, the timing signal generation circuit 401, the phase code generator 22, the phase code comparator 80, the Up/Dn accumulation circuit 64, the Up/Dn generator 66, and the phase code generator 68 have low pass filter characteristics, which prevent a component of 1 Hz or more from being transferred to the transmission clock signal, in phase fluctuation included in the reception data signal.

Thus, in the reception device 62A, it is possible to generate a clock signal for external use having a fixed frequency based on an average value of cumulative values acquired when the reception data signal has been normal even when any defect has occurred in a reception data signal when the clock signal output from the phase combiner 70 has been used as a clock signal for external use.

Second Modified Example

FIG. 29 is a block diagram illustrating a configuration of a reception device 62B which is the modified example of the reception device 62. The reception device 62B includes a clock/data reproduction unit 62a and two synchronous clock generation units 62c.

One of the two synchronous clock generation units 62c generates a clock signal for external use as illustrated in FIG. 28 described above. The other of the two synchronous clock generation units 62c generates a transmission clock signal as illustrated in FIG. 27 described above. In the reception device 62B, a phase code_rx signal output from a phase code generator 22 of the clock/data reproduction unit 62a is input to each of phase code generators 80 of the two synchronous clock generation units 62c.

In addition, in the reception device 62B, the serializer 172 and the output buffer 174 described above are provided. Accordingly, the transmission clock signal generated by the other of the two synchronous clock generation units 62c is input to the serializer 172 as illustrated in FIG. 27.

Thus, in the reception device 62B, both a clock signal for external use and a transmission clock signal are generated by two synchronous clock generation units 62c having the same configuration. Also, in the synchronous clock generation unit 62c which generates the transmission clock signal, the Up/Dn averaging circuit 40, the lock detector 42, the holdover controller 46, the activity monitor 44, and the multiplexer 30 may not be provided.

Third Modified Example

Figure 30:
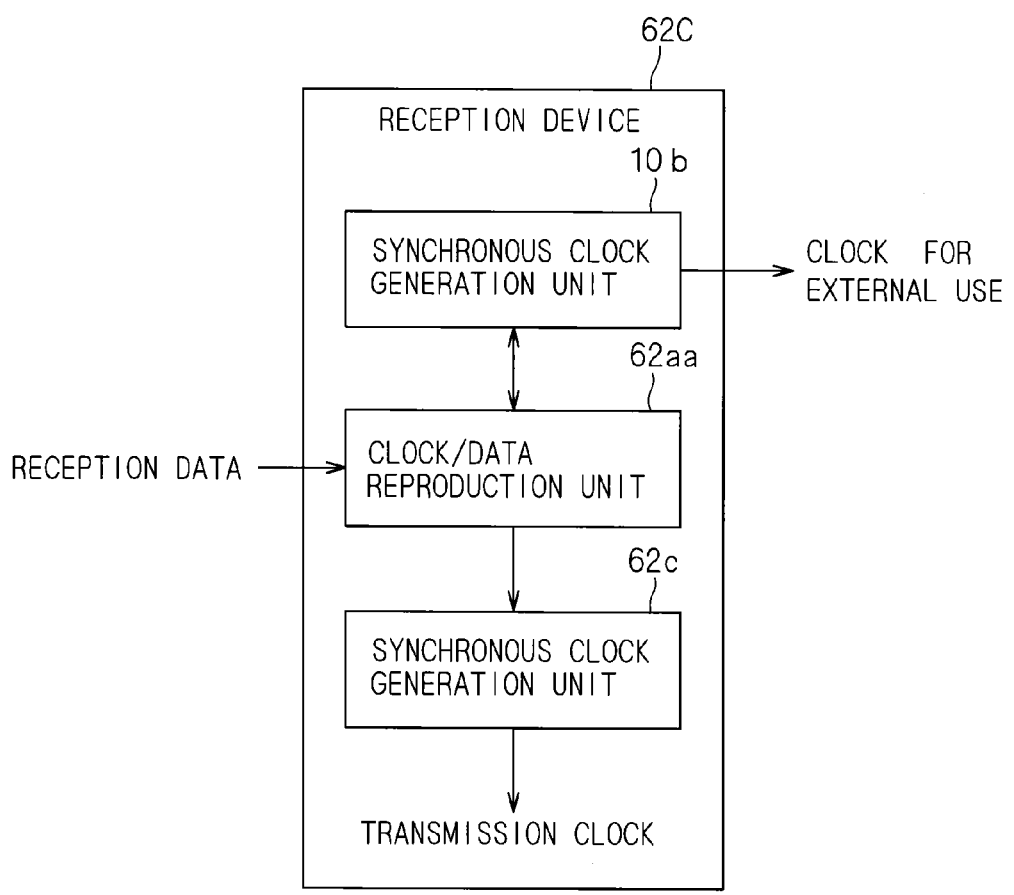
FIG. 30 is a block diagram illustrating a configuration of a modified example of the reception device according to the second preferred embodiment.

FIG. 30 is a block diagram illustrating a configuration of a reception device 62C which is a modified example of the reception device 62. The reception device 62C includes a clock/data reproduction unit 62aa, which is a modified example of the clock/data reproduction unit 62a, a synchronous clock generation unit 62c, and the synchronous clock generation unit 10b in the first preferred embodiment.

Figure 31:
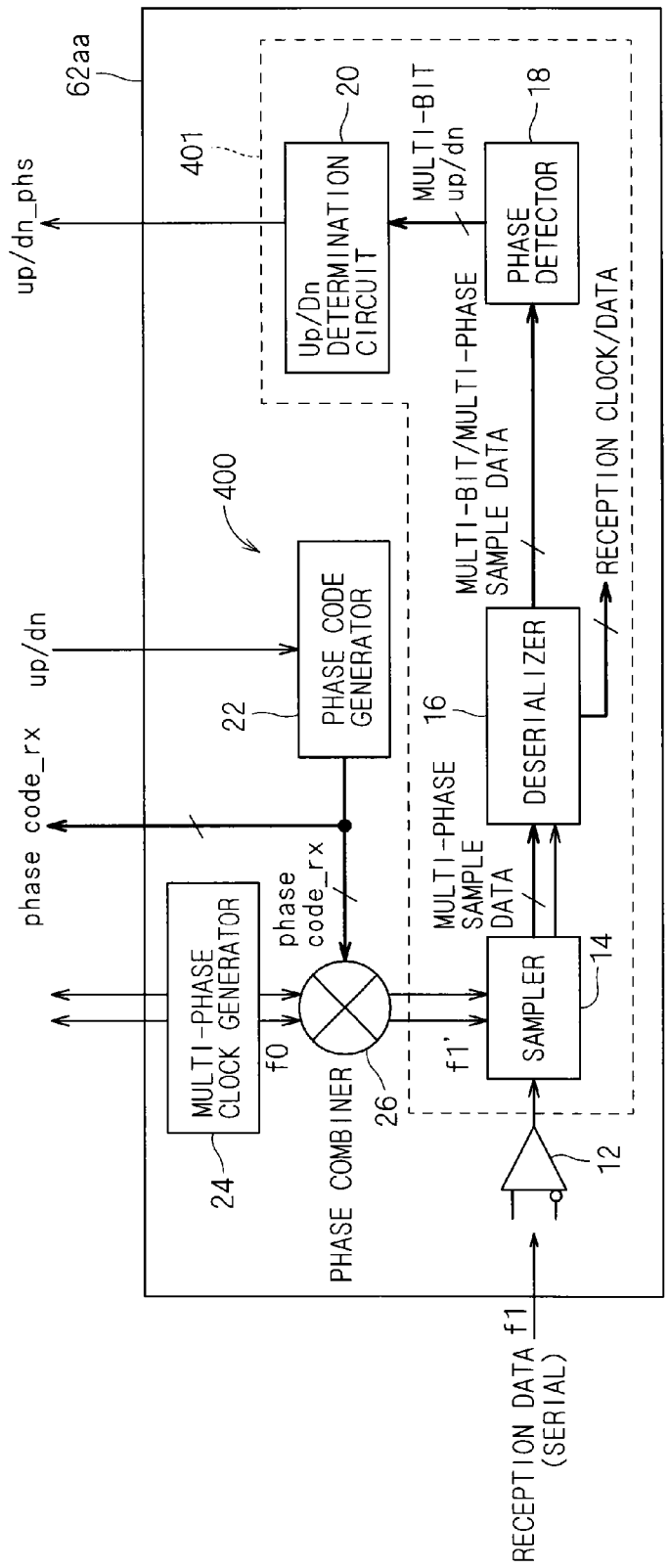
FIG. 31 is a block diagram illustrating a configuration of a modified example of the clock/data reproduction unit according to the second preferred embodiment.

FIG. 31 is a diagram illustrating a configuration of the clock/data reproduction unit 62aa. The clock/data reproduction unit 62aa is different from the clock/data reproduction unit 62a, and an output signal of the Up/Dn determination circuit 20 is not input to the phase code generator 22. The output signal of the Up/Dn determination circuit 20 is output as an up/dn_phs signal outside the clock/data reproduction unit 62aa. In addition, a phase code_rx signal output from the phase code generator 22 is output outside the clock/data reproduction unit 62aa as in the clock/data reproduction unit 62a.

In the synchronous clock generation unit 10b, the up/dn_phs signal output from the clock/data reproduction unit 62aa is input to the Up/Dn accumulation circuit 28 and the arbiter 38. The synchronous clock generation unit 10b generates a clock signal for external use as illustrated in FIG. 9.

In the synchronous clock generation unit 62c, the phase code_rx signal output from the clock/data reproduction unit 62aa is input to the phase code comparator 80. As illustrated in FIG. 27, the synchronous clock generation unit 62c generates a transmission clock signal. In the reception device 62C, the serializer 172 and the output buffer 174 are provided. A transmission clock signal generated by the synchronous clock generation unit 62c is input to the serializer 172.

In the reception device 62C having such a configuration, differently from the reception device 62B, both a clock signal for external use and a transmission clock signal are generated by the synchronous clock generation units 10b and 62c having different configurations. Because the synchronous clock generation unit 10b has a simpler configuration than the synchronous clock generation unit 62c, the configuration of the reception device 62C is more simplified than that of the reception device 62B.

Also, in the synchronous clock generation unit 62c which generates a transmission clock signal, the Up/Dn averaging circuit 40, the lock detector 42, the holdover controller 46, the activity monitor 44, and the multiplexer 30 may not be provided.

In addition, in the reception device 62C, a transmission clock signal may be generated by the synchronous clock generation unit 10b as illustrated in FIG. 19, and a clock signal for external use may be generated by the synchronous clock generation unit 62c as illustrated in FIG. 28.

While the reception device has been shown and described in detail, the foregoing description is in all aspects illustrative and the invention is not limited to thereto. Moreover, a combination of the above modified examples is applicable as long as they do not contradict each other. It is therefore understood that numerous modifications and variations not illustrated can be devised without departing from the scope of the invention.

What is claimed is:

1. A reception device comprising:
   a clock and data reproduction unit which receives a reception data signal to generate a reception clock signal synchronized with the reception data signal and reproduces data from the reception data signal using the reception clock signal; and
   a synchronous clock generation unit which generates a first synchronous clock signal which is synchronized with said reception data signal and of which frequency stability is high compared to said reception clock signal,
   wherein said clock and data reproduction unit includes:
      a local clock source which generates a multi-phase local clock signal having a fixed frequency; and
      a first generation unit which generates said reception clock signal from said multi-phase local clock signal,
   wherein said synchronous clock generation unit includes:
      a first phase setting circuit which generates a first phase setting signal;
      a first synchronous clock signal generator which generates said first synchronous clock signal having a phase set by said first phase setting signal from said multi-phase local clock signal; and
      a second generation unit which generates a second signal including a frequency component representing a frequency offset between said multi-phase local clock signal and said reception data signal by removing a phase fluctuation component representing phase fluctuation of the reception data signal from a first signal including the frequency component and the phase fluctuation component, and
   wherein said first phase setting circuit updates said first phase setting signal according to said second signal.

2. The reception device according to claim 1,
   wherein said first generation unit includes:
      a second phase setting circuit which generates a second phase setting signal;
      a reception clock signal generator which generates said reception clock signal having the phase set by said second phase setting signal from said multi-phase local clock signal; and
      a first timing signal generation circuit which generates a first timing signal representing a direction in which the phase of the reception clock signal should be changed based on a result obtained by comparing a timing of an edge of said reception data signal to a timing of an edge of said reception clock signal,
   wherein said second generation unit includes:
      a first accumulation circuit which holds a first cumulative value obtained by accumulating said first timing signal serving as said first signal; and
      a second timing signal generation circuit which generates a second timing signal serving as said second signal according to said first cumulative value, said second timing signal representing a direction in which the phase of said reception clock signal should be changed,
   wherein said second phase setting circuit updates said second phase setting signal according to both said first timing signal and said second timing signal, and
   wherein said first phase setting circuit updates said first phase setting signal according to only said second timing signal between said first timing signal and said second timing signal.

3. The reception device according to claim 1,
   wherein said first generation unit includes:
      a second phase setting circuit which generates a second phase setting signal;
      a reception clock signal generator which generates said reception clock signal having the phase set by said second phase setting signal from said multi-phase local clock signal; and
      a first timing signal generation circuit which generates a first timing signal representing a direction in which the phase of the reception clock signal should be changed based on a result obtained by comparing a timing of an edge of said reception data signal to a timing of an edge of said reception clock signal,
   wherein said second phase setting circuit updates said second phase setting signal according to said first timing signal,
   wherein said second generation unit includes:
      a third phase setting circuit which generates a third phase setting signal updated by following up an update of said second phase setting signal serving as said first signal;
      a comparison circuit which generates a comparison timing signal representing a direction in which the third phase setting signal should be updated based on a result obtained by comparing said second phase setting signal and said third phase setting signal;
      a first accumulation circuit which holds a first cumulative value obtained by accumulating said comparison timing signal; and
      a second timing signal generation circuit which generates a second timing signal serving as said second signal according to said first cumulative value, said second timing signal representing a direction in which said third phase setting signal should be updated,
   wherein said third phase setting circuit updates said third phase setting signal according to both said comparison timing signal and said second timing signal, and
   wherein said first phase setting circuit updates said first phase setting signal according to only said second timing signal between said comparison timing signal and said second timing signal.

4. The reception device according to claim 2, wherein said second timing signal generation circuit generates said second timing signal so that the phase of said first synchronous clock signal is varied at a speed according to said first cumulative value.

5. The reception device according to claim 3, wherein said second timing signal generation circuit generates said second timing signal so that the phase of said first synchronous clock signal is varied at a speed according to said first cumulative value.

6. The reception device according to claim 4, wherein said second timing signal generation circuit includes a first cumulative adder which receives said first cumulative value at a fixed time interval and generates a first cumulative addition value by cumulatively adding the received first cumulative value, subtracts a first predetermined value from the first cumulative addition value every time the first cumulative addition value reaches the first predetermined value, and generates said second timing signal.

7. The reception device according to claim 5, wherein said second timing signal generation circuit includes a first cumulative adder which receives said first cumulative value at a fixed time interval and generates a first cumulative addition value by cumulatively adding the received first cumulative value, subtracts a first predetermined value from the first cumulative addition value every time the first cumulative addition value reaches the first predetermined value, and generates said second timing signal.

8. The reception device according to claim 2, wherein said synchronous clock generation unit further includes:
 a storage circuit which stores said first cumulative value held by said first accumulation circuit; and
 a data signal stop determination unit which supplies said first cumulative value stored by said storage circuit to said second timing signal generation circuit instead of supplying said first cumulative value from said first accumulation circuit to said second timing signal generation circuit when said data signal stop determination unit determines that said reception data signal is stopped.

9. The reception device according to claim 3, wherein said synchronous clock generation unit further includes:
 a storage circuit which stores said first cumulative value held by said first accumulation circuit; and
 a data signal stop determination unit which supplies said first cumulative value stored by said storage circuit to said second timing signal generation circuit instead of supplying said first cumulative value from said first accumulation circuit to said second timing signal generation circuit when said data signal stop determination unit determines that said reception data signal is stopped.

10. The reception device according to claim 8, wherein said data signal stop determination unit includes at least one of:
 a first determination circuit which determines that said reception data signal is stopped when a state transition rate of said reception data signal is less than a first threshold value; or
 a second determination circuit which determines that said reception data signal is stopped when a change rate of said first cumulative value exceeds a second threshold value.

11. The reception device according to claim 9, wherein said data signal stop determination unit includes at least one of:
 a first determination circuit which determines that said reception data signal is stopped when a state transition rate of said reception data signal is less than a first threshold value; or
 a second determination circuit which determines that said reception data signal is stopped when a change rate of said first cumulative value exceeds a second threshold value.

12. The reception device according to claim 8,
 wherein said first timing signal generation circuit generates an invalid signal when a relationship between a timing of an edge of said reception data signal and a timing of an edge of said reception clock signal is in an invalid range, and
 wherein said data signal stop determination unit includes a third determination circuit which determines that said reception data signal is stopped when a generation rate of said invalid signal exceeds a third threshold value.

13. The reception device according to claim 9,
 wherein said first timing signal generation circuit generates an invalid signal when a relationship between a timing of an edge of said reception data signal and a timing of an edge of said reception clock signal is in an invalid range, and
 wherein said data signal stop determination unit includes a third determination circuit which determines that said reception data signal is stopped when a generation rate of said invalid signal exceeds a third threshold value.

14. The reception device according to claim 2,
 wherein said reception device constitutes a line terminating device which receives said reception data signal generated by a reference device from a station-side terminating device, and
 wherein said reception device supplies said first synchronous clock signal to a subscriber-side device which is caused to operate in synchronization with said reference device.

15. The reception device according to claim 3,
 wherein said reception device constitutes a line terminating device which receives said reception data signal generated by a reference device from a station-side terminating device, and
 wherein said reception device supplies said first synchronous clock signal to a subscriber-side device which is caused to operate in synchronization with said reference device.

16. The reception device according to claim 2,
 wherein said reception device constitutes a line terminating device which receives said reception data signal from a station-side terminating device, and
 wherein said reception device further comprises:
 a transmission circuit which transmits a transmission data signal generated based on said first synchronous clock signal to said station-side terminating device.

17. The reception device according to claim 3,
 wherein said reception device constitutes a line terminating device which receives said reception data signal from a station-side terminating device, and
 wherein said reception device further comprises:
 a transmission circuit which transmits a transmission data signal generated based on said first synchronous clock signal to said station-side terminating device.

18. The reception device according to claim 3, further comprising:
 a second accumulation circuit which holds a second cumulative value obtained by accumulating said first timing signal;
 a third timing signal generation circuit which generates a third timing signal according to said second cumulative value, said third timing signal representing a direction in which the phase of said reception clock signal should be changed;
 a fourth phase setting circuit which generates a fourth phase setting signal; and
 a second synchronous clock signal generator which generates, from said multi-phase local clock signal, a second synchronous clock signal which is synchronized with said reception data signal and has a phase set by said fourth phase setting signal,
 wherein said second phase setting circuit updates said second phase setting signal according to both said first timing signal and said third timing signal, and wherein said fourth phase setting circuit updates said fourth phase setting signal according to only said third timing signal between said first timing signal and said third timing signal.

19. The reception device according to claim 18, wherein said third timing signal generation circuit generates said third timing signal so that the phase of said second synchronous clock signal is varied at a speed according to said second cumulative value.

20. The reception device according to claim 19, wherein said third timing signal generation circuit includes a second cumulative adder which receives said second cumulative value at a fixed time interval and generates a second cumulative addition value by cumulatively adding the received second cumulative value, subtracts a second predetermined value from the second cumulative addition value every time the second cumulative addition value reaches the second predetermined value, and generates said third timing signal.

21. The reception device according to claim 18,
wherein said reception device constitutes a line terminating device which receives said reception data signal generated by a reference device from a station-side terminating device, and
wherein said reception device further comprises a transmission circuit, which transmits a transmission data signal generated based on said first synchronous clock signal to said station-side terminating device, and supplies said second synchronous clock signal to a subscriber-side device which is caused to operate in synchronization with said reference device.

22. The reception device according to claim 21,
wherein said first timing signal generation circuit, said second phase setting circuit, said comparison circuit, said first accumulation circuit, said second timing signal generation circuit, and said first phase setting circuit have first low pass filter characteristics, which prevent a component of a first cutoff frequency and more, in phase fluctuation included in said reception data signal, from being transferred to said first synchronous clock signal, and
wherein said first timing signal generation circuit, said second accumulation circuit, said third timing signal generation circuit, and said fourth phase setting circuit have second low pass filter characteristics, which prevent a component of a second cutoff frequency and more, in the phase fluctuation included in said reception data signal, from being transferred to said second synchronous clock signal, said second cutoff frequency being lower than said first cutoff frequency.

* * * * *